(12) United States Patent
Jisrawi et al.

(10) Patent No.: US 9,898,162 B2
(45) Date of Patent: Feb. 20, 2018

(54) SWIPING FUNCTIONS FOR MESSAGING APPLICATIONS

(71) Applicant: Apple Inc., Cupertino, CA (US)

(72) Inventors: Mohammed N. Jisrawi, Santa Clara, CA (US); Cristobal Baray, Sunnyvale, CA (US); Stephen O. Lemay, San Francisco, CA (US); Tiffany S. Jon, San Francisco, CA (US); Chanaka G. Karunamuni, San Jose, CA (US); Lawrence Y. Yang, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 363 days.

(21) Appl. No.: 14/292,262

(22) Filed: May 30, 2014

(65) Prior Publication Data

US 2015/0346916 A1 Dec. 3, 2015

(51) Int. Cl.
*G06F 3/00* (2006.01)
*G06F 3/0482* (2013.01)
(Continued)

(52) U.S. Cl.
CPC .......... *G06F 3/0482* (2013.01); *G06F 3/0488* (2013.01); *G06F 3/04817* (2013.01); *G06F 3/04847* (2013.01); *G06F 3/04883* (2013.01); *H04L 51/046* (2013.01); *H04L 51/14* (2013.01); *H04L 51/22* (2013.01)

(58) Field of Classification Search
CPC combination set(s) only.
See application file for complete search history.

(56) References Cited

U.S. PATENT DOCUMENTS

| 4,734,689 A | 3/1988 | Kurakake |
| 4,763,356 A | 8/1988 | Day, Jr. et al. |

(Continued)

FOREIGN PATENT DOCUMENTS

| CN | 101910988 A | 12/2010 |
| CN | 101943990 A | 1/2011 |

(Continued)

OTHER PUBLICATIONS http://web.archive.org/web/20130927115326/http://www.macobserver.com/tmo/article/ios-7-mails-swipe-to-delete-reverses-direction-from-ios-6 ; Sep. 23, 2013.
(Continued)

*Primary Examiner* — Hien Duong
(74) *Attorney, Agent, or Firm* — Dentons US LLP

(57) ABSTRACT

This application relates to performing organizational tasks using a variety of physical operations in a message application. The physical operations can include swiping actions performed by the user of the message application. By performing certain types of swipes on a user interface of the message application, the user can more readily organize messages stored by the message application. The types of swipes can include full swipes, which can execute one or more functions on a message, and partial swipes, which can open up a menu that includes multiple buttons for executing various operations on the message being swiped. Additionally, the direction of the swipe can also determine the functions and operations to be performed on the message being swiped.

21 Claims, 8 Drawing Sheets

(51) Int. Cl.
   *G06F 3/0481*  (2013.01)
   *G06F 3/0484*  (2013.01)
   *G06F 3/0488*  (2013.01)
   *H04L 12/58*   (2006.01)

(56) References Cited

U.S. PATENT DOCUMENTS

| | | |
|---|---|---|
| 5,283,856 A | 2/1994 | Gross et al. |
| 5,347,295 A | 9/1994 | Agulnick et al. |
| 5,444,841 A | 8/1995 | Glaser et al. |
| 5,481,278 A | 1/1996 | Shigematsu et al. |
| 5,627,567 A | 5/1997 | Davidson |
| 5,689,550 A | 11/1997 | Garson et al. |
| 5,764,518 A | 6/1998 | Collins |
| 5,943,052 A | 8/1999 | Allen et al. |
| 5,950,168 A | 9/1999 | Simborg et al. |
| 5,956,486 A | 9/1999 | Hickman et al. |
| 5,973,676 A | 10/1999 | Kawakura |
| 6,037,937 A | 3/2000 | Beaton et al. |
| 6,084,585 A | 7/2000 | Kraft et al. |
| 6,137,488 A | 10/2000 | Kraft et al. |
| 6,154,758 A | 11/2000 | Chiang |
| 6,185,551 B1 | 2/2001 | Birrell et al. |
| 6,209,100 B1 | 3/2001 | Robertson et al. |
| 6,259,436 B1 | 7/2001 | Moon et al. |
| 6,381,579 B1 | 4/2002 | Gervais et al. |
| 6,492,979 B1 | 12/2002 | Kent et al. |
| 6,510,452 B1 | 1/2003 | Brisebois et al. |
| 6,542,171 B1 | 4/2003 | Satou et al. |
| 6,826,639 B2 | 11/2004 | Pasumansky et al. |
| 6,898,563 B1 | 5/2005 | McFarland |
| 6,922,816 B1 | 7/2005 | Amin et al. |
| 6,924,822 B2 | 8/2005 | Card et al. |
| 6,938,220 B1 | 8/2005 | Shigematsu et al. |
| 6,954,899 B1 | 10/2005 | Anderson |
| 6,995,746 B2 | 2/2006 | Aymeric |
| 7,007,226 B1 | 2/2006 | Smith et al. |
| 7,007,239 B1 | 2/2006 | Hawkins et al. |
| 7,110,864 B2 | 9/2006 | Restrepo et al. |
| 7,222,299 B1 | 5/2007 | Lim et al. |
| 7,421,472 B1 | 9/2008 | Ross, Jr. |
| 7,437,683 B1 | 10/2008 | Beezer et al. |
| 7,480,867 B1 | 1/2009 | Racine et al. |
| 7,489,306 B2 | 2/2009 | Kolmykov-Zotov et al. |
| 7,539,730 B2 | 5/2009 | Adams et al. |
| 7,584,254 B2 | 9/2009 | Adams et al. |
| 7,631,271 B2 | 12/2009 | Griffith |
| D611,054 S | 3/2010 | Lin et al. |
| 7,730,401 B2 | 6/2010 | Gillespie et al. |
| 7,743,105 B2 | 6/2010 | Bauchot et al. |
| 7,747,690 B2 | 6/2010 | Kraenzel et al. |
| 7,770,121 B2 | 8/2010 | Jain et al. |
| 7,912,904 B2 | 3/2011 | Buchheit et al. |
| 7,953,805 B2 | 5/2011 | Gupta et al. |
| 8,131,298 B1 | 3/2012 | Beyer, Jr. |
| 8,289,162 B2 | 10/2012 | Mooring et al. |
| 8,296,369 B2 | 10/2012 | Kamat et al. |
| 8,307,036 B2 | 11/2012 | Kamat et al. |
| 8,330,715 B2 | 12/2012 | Yadavalli et al. |
| 8,332,477 B1 | 12/2012 | Kaiserlian et al. |
| 8,341,036 B2 | 12/2012 | Hartman et al. |
| 8,341,529 B1 | 12/2012 | Li et al. |
| 8,347,232 B1 | 1/2013 | Prud'Hommeaux et al. |
| 8,358,321 B1 | 1/2013 | Weidner |
| 8,365,059 B2 | 1/2013 | Walsh et al. |
| 8,368,723 B1 | 2/2013 | Gossweiler, III et al. |
| 8,402,384 B2 | 3/2013 | Scott |
| 8,418,081 B2 | 4/2013 | Bartek et al. |
| 8,448,083 B1 | 5/2013 | Migos et al. |
| 8,520,025 B2 | 8/2013 | Patterson et al. |
| 8,665,225 B2 | 3/2014 | Herz et al. |
| 8,701,020 B1 | 4/2014 | Fulcher et al. |
| 8,756,522 B2 | 6/2014 | Lee et al. |
| 8,842,082 B2 | 9/2014 | Migos et al. |
| 8,850,350 B2 | 9/2014 | Bi et al. |
| 8,863,020 B2 | 10/2014 | Hymel |
| 9,026,932 B1 | 5/2015 | Dixon |
| 9,032,338 B2 | 5/2015 | Murrett et al. |
| 9,047,009 B2 | 6/2015 | King et al. |
| 9,092,132 B2 | 7/2015 | Migos et al. |
| 9,104,647 B2 | 8/2015 | Artin |
| 9,113,193 B1 | 8/2015 | Gardes et al. |
| 9,117,426 B2 | 8/2015 | Wieder |
| 9,229,634 B2 | 1/2016 | Herz et al. |
| 9,250,798 B2 | 2/2016 | Migos et al. |
| 9,280,263 B2 * | 3/2016 | Kim .................... G06F 3/0482 |
| 9,483,755 B2 | 11/2016 | Lemay |
| 9,654,426 B2 * | 5/2017 | Underwood, IV ...... H04L 51/00 |
| 2002/0013817 A1 | 1/2002 | Collins et al. |
| 2002/0015064 A1 | 2/2002 | Robotham et al. |
| 2002/0051018 A1 | 5/2002 | Yeh |
| 2002/0055506 A1 | 5/2002 | Diamond et al. |
| 2002/0143792 A1 | 10/2002 | Belu |
| 2002/0174194 A1 | 11/2002 | Mooney et al. |
| 2002/0180763 A1 | 12/2002 | Kung |
| 2002/0185357 A1 | 12/2002 | Haukaas et al. |
| 2003/0006967 A1 | 1/2003 | Pihlaja |
| 2003/0063073 A1 | 4/2003 | Geaghan et al. |
| 2003/0076306 A1 | 4/2003 | Zadesky et al. |
| 2003/0126136 A1 | 7/2003 | Omoigui |
| 2003/0135555 A1 | 7/2003 | Birrel et al. |
| 2003/0142081 A1 | 7/2003 | Iizuka et al. |
| 2003/0182310 A1 | 9/2003 | Charnock et al. |
| 2004/0015548 A1 | 1/2004 | Lee |
| 2004/0017355 A1 | 1/2004 | Shim |
| 2004/0021643 A1 | 2/2004 | Hoshino et al. |
| 2004/0054627 A1 | 3/2004 | Rutledge |
| 2004/0068409 A1 | 4/2004 | Tanaka et al. |
| 2004/0083226 A1 | 4/2004 | Eaton |
| 2004/0108995 A1 | 6/2004 | Hoshino et al. |
| 2004/0119745 A1 | 6/2004 | Bartek et al. |
| 2004/0133564 A1 | 7/2004 | Gross et al. |
| 2004/0139162 A1 | 7/2004 | Adams et al. |
| 2004/0139163 A1 | 7/2004 | Adams et al. |
| 2004/0140984 A1 | 7/2004 | Hinckley et al. |
| 2004/0178997 A1 | 9/2004 | Gillespie et al. |
| 2004/0218104 A1 | 11/2004 | Smith et al. |
| 2004/0263487 A1 | 12/2004 | Mayoraz et al. |
| 2004/0268265 A1 | 12/2004 | Berger |
| 2005/0043968 A1 | 2/2005 | Sauerwald |
| 2005/0099654 A1 | 5/2005 | Chen |
| 2005/0144241 A1 | 6/2005 | Stata et al. |
| 2005/0165824 A1 | 7/2005 | Farnham et al. |
| 2005/0172001 A1 | 8/2005 | Zaner et al. |
| 2005/0190970 A1 | 9/2005 | Griffin |
| 2005/0193351 A1 | 9/2005 | Huoviala |
| 2005/0198143 A1 | 9/2005 | Moody et al. |
| 2005/0222985 A1 | 10/2005 | Buchheit et al. |
| 2005/0223057 A1 | 10/2005 | Buchheit et al. |
| 2005/0223058 A1 | 10/2005 | Buchheit et al. |
| 2005/0223066 A1 | 10/2005 | Buchheit et al. |
| 2005/0223067 A1 | 10/2005 | Buchheit et al. |
| 2005/0223326 A1 | 10/2005 | Chang et al. |
| 2005/0234910 A1 | 10/2005 | Buchheit et al. |
| 2005/0262203 A1 | 11/2005 | Buchheit et al. |
| 2005/0275637 A1 | 12/2005 | Hinckley et al. |
| 2005/0283520 A1 | 12/2005 | Gardner et al. |
| 2006/0007174 A1 | 1/2006 | Shen |
| 2006/0022955 A1 | 2/2006 | Kennedy |
| 2006/0023849 A1 | 2/2006 | Timmins et al. |
| 2006/0038796 A1 | 2/2006 | Hinckley et al. |
| 2006/0048072 A1 | 3/2006 | Jarrett et al. |
| 2006/0085757 A1 | 4/2006 | Andre et al. |
| 2006/0092142 A1 | 5/2006 | Gillespie et al. |
| 2006/0095506 A1 | 5/2006 | Scott |
| 2006/0117273 A1 | 6/2006 | Smith et al. |
| 2006/0125803 A1 | 6/2006 | Westerman et al. |
| 2006/0128404 A1 | 6/2006 | Klassen et al. |
| 2006/0132456 A1 | 6/2006 | Anson |
| 2006/0168025 A1 | 7/2006 | Jain |
| 2006/0190828 A1 | 8/2006 | Zaner et al. |
| 2006/0199612 A1 | 9/2006 | Beyer et al. |
| 2006/0242607 A1 | 10/2006 | Hudson |
| 2006/0248151 A1 | 11/2006 | Belakovskiy et al. |

(56) References Cited

U.S. PATENT DOCUMENTS

| | | |
|---|---|---|
| 2006/0253018 A1 | 11/2006 | Speier et al. |
| 2006/0253418 A1 | 11/2006 | Charnock et al. |
| 2006/0277488 A1 | 12/2006 | Cok et al. |
| 2006/0290679 A1 | 12/2006 | Lii |
| 2007/0033258 A1 | 2/2007 | Vasilaky et al. |
| 2007/0050697 A1 | 3/2007 | Lewis-Bowen et al. |
| 2007/0060228 A1 | 3/2007 | Akasaka et al. |
| 2007/0061369 A1 | 3/2007 | Folting et al. |
| 2007/0061738 A1 | 3/2007 | Taboada et al. |
| 2007/0062852 A1 | 3/2007 | Zachut et al. |
| 2007/0067744 A1 | 3/2007 | Lane et al. |
| 2007/0106570 A1 | 5/2007 | Hartman et al. |
| 2007/0124503 A1 | 5/2007 | Ramos et al. |
| 2007/0143703 A1 | 6/2007 | Griffith |
| 2007/0150842 A1 | 6/2007 | Chaudhri et al. |
| 2007/0152978 A1 | 7/2007 | Kocienda et al. |
| 2007/0152980 A1 | 7/2007 | Kocienda et al. |
| 2007/0173267 A1 | 7/2007 | Klassen et al. |
| 2007/0178941 A1 | 8/2007 | Fujimoto et al. |
| 2007/0192744 A1 | 8/2007 | Reponen |
| 2007/0195067 A1 | 8/2007 | Zotov et al. |
| 2007/0232360 A1 | 10/2007 | Bocking et al. |
| 2007/0233788 A1 | 10/2007 | Bender |
| 2007/0247442 A1 | 10/2007 | Andre et al. |
| 2007/0247446 A1 | 10/2007 | Orsley et al. |
| 2007/0268274 A1 | 11/2007 | Westerman et al. |
| 2007/0277126 A1 | 11/2007 | Park et al. |
| 2007/0280179 A1 | 12/2007 | Van Belle et al. |
| 2007/0282957 A1 | 12/2007 | Van Belle et al. |
| 2007/0294617 A1 | 12/2007 | Kroeger |
| 2007/0300182 A1 | 12/2007 | Bilow |
| 2008/0012835 A1 | 1/2008 | Rimon et al. |
| 2008/0022215 A1 | 1/2008 | Lee et al. |
| 2008/0036743 A1 | 2/2008 | Westerman et al. |
| 2008/0094356 A1 | 4/2008 | Ording et al. |
| 2008/0094368 A1 | 4/2008 | Ording et al. |
| 2008/0098327 A1 | 4/2008 | Berkovitz et al. |
| 2008/0122796 A1 | 5/2008 | Jobs et al. |
| 2008/0134101 A1 | 6/2008 | Newman |
| 2008/0153459 A1 | 6/2008 | Kansal et al. |
| 2008/0165142 A1 | 7/2008 | Kocienda et al. |
| 2008/0165145 A1 | 7/2008 | Herz et al. |
| 2008/0165160 A1 | 7/2008 | Kocienda et al. |
| 2008/0168349 A1 | 7/2008 | Lamiraux et al. |
| 2008/0168404 A1 | 7/2008 | Ording |
| 2008/0180391 A1 | 7/2008 | Auciello et al. |
| 2008/0180408 A1 | 7/2008 | Forstall et al. |
| 2008/0229254 A1 | 9/2008 | Warner |
| 2008/0256469 A1 | 10/2008 | Jain et al. |
| 2008/0259040 A1 | 10/2008 | Ording et al. |
| 2008/0263473 A1 | 10/2008 | Becker et al. |
| 2008/0281813 A1 | 11/2008 | Moody et al. |
| 2008/0285587 A1 | 11/2008 | Balk et al. |
| 2008/0294730 A1 | 11/2008 | Oral et al. |
| 2008/0295001 A1 | 11/2008 | Moody et al. |
| 2008/0320391 A1 | 12/2008 | Lemay et al. |
| 2009/0015559 A1 | 1/2009 | Day et al. |
| 2009/0029674 A1 | 1/2009 | Brezina et al. |
| 2009/0030872 A1 | 1/2009 | Brezina et al. |
| 2009/0030919 A1 | 1/2009 | Brezina et al. |
| 2009/0030933 A1 | 1/2009 | Brezina et al. |
| 2009/0030940 A1 | 1/2009 | Brezina et al. |
| 2009/0031244 A1 | 1/2009 | Brezina et al. |
| 2009/0031245 A1 | 1/2009 | Brezina et al. |
| 2009/0041052 A1 | 2/2009 | Balk et al. |
| 2009/0047983 A1 | 2/2009 | Klassen et al. |
| 2009/0052778 A1 | 2/2009 | Edgecomb et al. |
| 2009/0064047 A1 | 3/2009 | Shim et al. |
| 2009/0083387 A1 | 3/2009 | Gardner et al. |
| 2009/0106415 A1 | 4/2009 | Brezina et al. |
| 2009/0106676 A1 | 4/2009 | Brezina et al. |
| 2009/0109182 A1 | 4/2009 | Fyke et al. |
| 2009/0113328 A1 | 4/2009 | Leonard |
| 2009/0122018 A1 | 5/2009 | Vymenets et al. |
| 2009/0125824 A1 | 5/2009 | Andrews et al. |
| 2009/0140986 A1 | 6/2009 | Karkkainen et al. |
| 2009/0144634 A1 | 6/2009 | Berger |
| 2009/0153288 A1 | 6/2009 | Hope et al. |
| 2009/0167700 A1 | 7/2009 | Westerman et al. |
| 2009/0176521 A1 | 7/2009 | Klassen et al. |
| 2009/0189858 A1 | 7/2009 | Lev et al. |
| 2009/0214034 A1 | 8/2009 | Mehrotra et al. |
| 2009/0228792 A1 | 9/2009 | Van Os et al. |
| 2009/0228807 A1 | 9/2009 | Lemay |
| 2009/0235196 A1* | 9/2009 | MacBeth ............ G06Q 10/107 715/780 |
| 2009/0239587 A1 | 9/2009 | Negron et al. |
| 2009/0249257 A1 | 10/2009 | Bove et al. |
| 2009/0249258 A1 | 10/2009 | Tang |
| 2009/0282360 A1* | 11/2009 | Park ..................... G06F 3/0482 715/786 |
| 2010/0011317 A1 | 1/2010 | Lee |
| 2010/0013780 A1 | 1/2010 | Ikeda et al. |
| 2010/0057879 A1 | 3/2010 | Buchheit et al. |
| 2010/0064017 A1 | 3/2010 | Buchheit et al. |
| 2010/0064261 A1 | 3/2010 | Andrews et al. |
| 2010/0087172 A1 | 4/2010 | Klassen et al. |
| 2010/0103124 A1 | 4/2010 | Kruzeniski et al. |
| 2010/0103127 A1 | 4/2010 | Park et al. |
| 2010/0107050 A1 | 4/2010 | Wang et al. |
| 2010/0127972 A1 | 5/2010 | Yadavalli et al. |
| 2010/0156813 A1 | 6/2010 | Duarte et al. |
| 2010/0169766 A1 | 7/2010 | Duarte et al. |
| 2010/0188352 A1 | 7/2010 | Ikeda |
| 2010/0214237 A1 | 8/2010 | Echeverri et al. |
| 2010/0220062 A1 | 9/2010 | Antila |
| 2010/0235726 A1 | 9/2010 | Ording et al. |
| 2010/0235785 A1 | 9/2010 | Ording et al. |
| 2010/0235793 A1 | 9/2010 | Ording et al. |
| 2010/0238139 A1 | 9/2010 | Goertz et al. |
| 2010/0241700 A1 | 9/2010 | Rasmussen et al. |
| 2010/0241749 A1 | 9/2010 | Rasmussen et al. |
| 2010/0250682 A1 | 9/2010 | Goldberg et al. |
| 2010/0281397 A1 | 11/2010 | Buchheit et al. |
| 2010/0283753 A1 | 11/2010 | Ohshita |
| 2010/0293242 A1 | 11/2010 | Buchheit et al. |
| 2010/0293460 A1 | 11/2010 | Budelli |
| 2010/0299599 A1* | 11/2010 | Shin ..................... G06F 3/0482 715/702 |
| 2010/0309148 A1 | 12/2010 | Fleizach et al. |
| 2011/0001694 A1 | 1/2011 | Homma et al. |
| 2011/0010182 A1 | 1/2011 | Turski et al. |
| 2011/0010340 A1 | 1/2011 | Hung et al. |
| 2011/0029918 A1 | 2/2011 | Yoo et al. |
| 2011/0037725 A1 | 2/2011 | Pryor |
| 2011/0039602 A1 | 2/2011 | McNamara et al. |
| 2011/0050607 A1 | 3/2011 | Park |
| 2011/0055753 A1 | 3/2011 | Horodezky et al. |
| 2011/0069006 A1 | 3/2011 | Liu et al. |
| 2011/0074699 A1 | 3/2011 | Marr et al. |
| 2011/0074710 A1 | 3/2011 | Weeldreyer et al. |
| 2011/0078560 A1 | 3/2011 | Weeldreyer et al. |
| 2011/0106439 A1 | 5/2011 | Huang et al. |
| 2011/0122159 A1 | 5/2011 | Bergsten et al. |
| 2011/0126126 A1 | 5/2011 | Blair |
| 2011/0128241 A1 | 6/2011 | Kang et al. |
| 2011/0130182 A1 | 6/2011 | Namba et al. |
| 2011/0175830 A1 | 7/2011 | Miyazawa et al. |
| 2011/0179387 A1 | 7/2011 | Shaffer et al. |
| 2011/0191718 A1 | 8/2011 | Hinckley et al. |
| 2011/0191719 A1 | 8/2011 | Hinckley et al. |
| 2011/0199393 A1 | 8/2011 | Nurse et al. |
| 2011/0202877 A1 | 8/2011 | Lassonde et al. |
| 2011/0221684 A1 | 9/2011 | Rydenhag |
| 2011/0231499 A1 | 9/2011 | Stovicek et al. |
| 2011/0231789 A1 | 9/2011 | Bukurak et al. |
| 2011/0231796 A1 | 9/2011 | Vigil |
| 2011/0238508 A1 | 9/2011 | Koningstein |
| 2011/0258537 A1 | 10/2011 | Rives et al. |
| 2011/0264689 A1 | 10/2011 | Hirst et al. |
| 2011/0289574 A1 | 11/2011 | Hull et al. |
| 2011/0302532 A1 | 12/2011 | Missig |
| 2011/0320978 A1 | 12/2011 | Horodezky et al. |
| 2012/0042278 A1 | 2/2012 | Vaisanen |

(56) References Cited

U.S. PATENT DOCUMENTS

| | | |
|---|---|---|
| 2012/0044177 A1 | 2/2012 | Ohta et al. |
| 2012/0046947 A1 | 2/2012 | Fleizach |
| 2012/0088524 A1 | 4/2012 | Moldaysky et al. |
| 2012/0096345 A1 | 4/2012 | Ho et al. |
| 2012/0110431 A1 | 5/2012 | Rosenfeld et al. |
| 2012/0120002 A1 | 5/2012 | Ota |
| 2012/0139844 A1 | 6/2012 | Ramstein et al. |
| 2012/0143972 A1 | 6/2012 | Malik et al. |
| 2012/0166998 A1 | 6/2012 | Cotterill et al. |
| 2012/0182226 A1 | 7/2012 | Tuli |
| 2012/0185498 A1 | 7/2012 | Loofbourrow et al. |
| 2012/0192086 A1 | 7/2012 | Ghods et al. |
| 2012/0210334 A1 | 8/2012 | Sutedja et al. |
| 2012/0233571 A1 | 9/2012 | Weyer et al. |
| 2012/0306765 A1 | 12/2012 | Moore |
| 2012/0311507 A1 | 12/2012 | Murrett et al. |
| 2013/0016129 A1 | 1/2013 | Gossweiler III et al. |
| 2013/0024820 A1 | 1/2013 | Kirkpatrick |
| 2013/0038541 A1 | 2/2013 | Bakker |
| 2013/0050119 A1 | 2/2013 | Nemoto |
| 2013/0055119 A1 | 2/2013 | Luong |
| 2013/0076591 A1 | 3/2013 | Sirpal et al. |
| 2013/0086480 A1 | 4/2013 | Sirpal et al. |
| 2013/0093764 A1 | 4/2013 | Andersson et al. |
| 2013/0097519 A1 | 4/2013 | Andersson et al. |
| 2013/0097520 A1 | 4/2013 | Lewin et al. |
| 2013/0097521 A1 | 4/2013 | Lewin et al. |
| 2013/0097526 A1 | 4/2013 | Stovicek et al. |
| 2013/0097534 A1 | 4/2013 | Lewin et al. |
| 2013/0097539 A1 | 4/2013 | Månsson et al. |
| 2013/0097562 A1 | 4/2013 | Kermoian et al. |
| 2013/0113720 A1 | 5/2013 | Van Eerd et al. |
| 2013/0159893 A1 | 6/2013 | Lewin et al. |
| 2013/0159902 A1 | 6/2013 | Kwak et al. |
| 2013/0167013 A1 | 6/2013 | Poliak |
| 2013/0185290 A1 | 7/2013 | Hirst et al. |
| 2013/0214995 A1 | 8/2013 | Lewin et al. |
| 2013/0222244 A1 | 8/2013 | Mak et al. |
| 2013/0227490 A1 | 8/2013 | Thorsander et al. |
| 2013/0263052 A1 | 10/2013 | Fong et al. |
| 2013/0265225 A1 | 10/2013 | Nasiri et al. |
| 2013/0286435 A1 | 10/2013 | Anezaki et al. |
| 2013/0290291 A1 | 10/2013 | Loofbourrow et al. |
| 2013/0311867 A1 | 11/2013 | Patterson et al. |
| 2014/0033032 A1* | 1/2014 | Reynolds ............... G06F 3/048 715/702 |
| 2014/0040835 A1 | 2/2014 | Hildreth et al. |
| 2014/0082521 A1 | 3/2014 | Carolan et al. |
| 2014/0105278 A1 | 4/2014 | Bivolarsky |
| 2014/0129457 A1 | 5/2014 | Peeler |
| 2014/0143728 A1 | 5/2014 | Coleman, Jr. et al. |
| 2014/0143738 A1 | 5/2014 | Underwood, IV et al. |
| 2014/0160073 A1 | 6/2014 | Matsuki |
| 2014/0191986 A1* | 7/2014 | Kim ............... G06F 3/0488 345/173 |
| 2014/0210756 A1 | 7/2014 | Lee et al. |
| 2014/0215382 A1 | 7/2014 | Engel |
| 2014/0222933 A1 | 8/2014 | Stovicek et al. |
| 2014/0223381 A1 | 8/2014 | Huang et al. |
| 2014/0300543 A1 | 10/2014 | Kim et al. |
| 2014/0309849 A1 | 10/2014 | Ricci |
| 2014/0351691 A1 | 11/2014 | Neil et al. |
| 2015/0028626 A1 | 1/2015 | Gopal et al. |
| 2015/0067596 A1 | 3/2015 | Brown et al. |
| 2015/0143258 A1 | 5/2015 | Carolan et al. |
| 2015/0199371 A1 | 7/2015 | Loofbourrow et al. |
| 2015/0212723 A1 | 7/2015 | Lim et al. |
| 2015/0235370 A1 | 8/2015 | Abovitz et al. |
| 2015/0248233 A1 | 9/2015 | Murrett et al. |
| 2015/0250682 A1 | 9/2015 | Bangera et al. |
| 2015/0286346 A1* | 10/2015 | Liu ............... G06F 3/0482 715/765 |
| 2015/0319297 A1 | 11/2015 | Beyer, Jr. et al. |
| 2015/0350143 A1 | 12/2015 | Yang et al. |
| 2015/0358580 A1 | 12/2015 | Zhou et al. |
| 2015/0363066 A1 | 12/2015 | Lemay et al. |
| 2016/0037124 A1 | 2/2016 | Song et al. |
| 2016/0039426 A1 | 2/2016 | Ricci |
| 2016/0065525 A1 | 3/2016 | Dye et al. |
| 2016/0147438 A1 | 5/2016 | Migos et al. |
| 2016/0259528 A1 | 9/2016 | Foss et al. |
| 2016/0357752 A1 | 12/2016 | Jon et al. |
| 2017/0019366 A1 | 1/2017 | Lemay |
| 2017/0083213 A1 | 3/2017 | Missig |

FOREIGN PATENT DOCUMENTS

| | | |
|---|---|---|
| EP | 0795811 A1 | 9/1997 |
| EP | 1271295 A2 | 1/2003 |
| EP | 2133841 A1 | 12/2009 |
| EP | 2180677 A2 | 4/2010 |
| EP | 2369820 A2 | 9/2011 |
| EP | 2381661 A1 | 10/2011 |
| EP | 2584770 A1 | 4/2013 |
| EP | 2770761 A1 | 8/2014 |
| TW | M401816 U1 | 4/2011 |
| WO | 1997/18508 A1 | 5/1997 |
| WO | 1999/38149 A1 | 7/1999 |
| WO | 2000/38042 A1 | 6/2000 |
| WO | 2002/103669 A1 | 12/2002 |
| WO | 2003/067497 A1 | 8/2003 |
| WO | 2004/070604 A2 | 8/2004 |
| WO | 2006/020305 A2 | 2/2006 |
| WO | 2006/115946 A2 | 11/2006 |
| WO | 2008/103018 A1 | 8/2008 |
| WO | 2009/072475 A1 | 6/2009 |
| WO | 2012/178121 A1 | 12/2012 |
| WO | 2012178121 A1 | 12/2012 |
| WO | 2013/016045 A1 | 1/2013 |

OTHER PUBLICATIONS

PCT Application No. PCT/US2015/027026—International Search Report and Written Opinion dated Jun. 23, 2015.
International Preliminary Report on Patentability received for PCT Patent Application No. PCT/US2015/027026, mailed on Dec. 15, 2016, 15 Pages.
Chen et al., "Navigation Techniques for Dual-Display E-Book Readers", CHI, Apr. 5-10, 2008, 10 pages.
Decision to Grant received for European Patent Application No. 11191132.7, dated Dec. 8, 2016, 3 pages.
Extended European Search Report received for European Patent Application No. 11191132.7, dated Jan. 24, 2012, 7 pages.
Final Office Action received for U.S. Appl. No. 11/969,796, dated Sep. 12, 2011, 30 pages.
Final Office Action received for U.S. Appl. No. 12/217,038, dated Oct. 31, 2011, 83 pages.
Final Office Action received for U.S. Appl. No. 12/794,625, dated Aug. 1, 2013, 12 pages.
Final Office Action received for U.S. Appl. No. 12/794,625, dated Jul. 17, 2015, 13 pages.
Final Office Action received for U.S. Appl. No. 13/077,754, dated Jan. 14, 2015, 16 pages.
Final Office Action received for U.S. Appl. No. 13/217,747, dated Feb. 21, 2014, 22 pages.
Final Office Action received for U.S. Appl. No. 13/217,747, dated Sep. 10, 2014, 24 pages.
Final Office Action received for U.S. Appl. No. 14/707,250, dated Dec. 16, 2016, 16 pages.
Guimbretiere, Francois, "Paper Augmented Digital Documents", ACM, vol. 5, No. 2, 2003, pp. 51-60.
Gutwin et al., "Improving Interpretation of Remote Gestures with Telepointer Traces", In Proceedings of the 2002 ACM Conference on Computer Supported Cooperative Work, Nov. 16-20, 2002, pp. 49-57.
Intention to Grant received for European Patent Application No. 11191132.7, dated Jul. 22, 2016, 8 pages.
International Preliminary Report on Patentability received for PCT Patent Application No. PCT/US2008/050426, dated Jul. 7, 2009, 8 pages.

(56) References Cited

OTHER PUBLICATIONS

International Preliminary Report on Patentability received for PCT Patent Application No. PCT/US2007/089030, dated Jul. 7, 2009, 7 pages.
International Preliminary Report on Patentability received for PCT Patent Application No. PCT/US2009/039625, dated Jan. 5, 2011, 6 pages.
International Preliminary Report on Patentability received for PCT Patent Application No. PCT/US2012/039867, dated Dec. 12, 2013, 8 pages.
International Search Report and Written Opinion received for PCT Patent Application No. PCT/US2007/089030, dated Jul. 9, 2008, 9 pages.
International Search Report and Written Opinion received for PCT Patent Application No. PCT/US2009/039625, dated Jun. 5, 2009, 8 pages.
International Search Report and Written Opinion received for PCT Patent Application No. PCT/US2012/039867, dated Aug. 13, 2012, 11 pages.
International Search Report and Written Opinion received in International Application No. PCT/US2008/050426, dated Jun. 13, 2008, 10 pages.
Introduction to Word Processing, available at <http://www2.raritanval.edu/departments/cis/full-time/Schwarz/security/word_one_pt2.htm>, Nov. 17, 2008, 9 pages.
Liao et al., "PACER: Fine-Grained Interactive Paper via Camera-Touch Hybrid Gestures on a Cell Phone", CHI 2010, ACM, Apr. 10-15, 2010, 10 pages.
Microsoft Corporation, "Microsoft Office Outlook 2003 Product Guide", 2004, pp. 29.
Non-Final Office Action received for U.S. Appl. No. 13/077,711, dated Apr. 25, 2014, 15 pages.
Non-Final Office Action received for U.S. Appl. No. 13/077,754, dated Mar. 21, 2014, 13 pages.
Non-Final Office Action received for U.S. Appl. No. 11/969,796, dated Mar. 1, 2011, 28 pages.
Non-Final Office Action received for U.S. Appl. No. 12/217,038, dated Aug. 17, 2012, 42 pages.
Non-Final Office Action received for U.S. Appl. No. 12/217,038, dated Feb. 24, 2012, 167 pages.
Non-Final Office Action received for U.S. Appl. No. 12/217,038, dated Jun. 14, 2011, 92 pages.
Non-Final Office Action received for U.S. Appl. No. 12/217,038, dated Mar. 21, 2013, 46 pages.
Non-Final Office Action received for U.S. Appl. No. 12/794,625, dated Mar. 13, 2014, 13 pages.
Non-Final Office Action received for U.S. Appl. No. 12/794,625, dated Oct. 8, 2014, 12 pages.
Non-Final Office Action received for U.S. Appl. No. 12/794,625, dated Oct. 26, 2012, 7 pages.
Non-Final Office Action received for U.S. Appl. No. 13/217,747, dated Aug. 16, 2013, 19 pages.
Non-Final Office Action received for U.S. Appl. No. 13/217,747, dated Jan. 4, 2013, 17 pages.
Non-Final Office Action received for U.S. Appl. No. 14/197,111, dated Feb. 20, 2015, 60 pages.
Non-Final Office Action received for U.S. Appl. No. 14/707,250, dated Jul. 15, 2016, 16 pages.
Non-Final Office Action received for U.S. Appl. No. 14/707,250, dated Jun. 26, 2017, 21 pages.
Non-Final Office Action received for U.S. Appl. No. 15/012,178, dated Sep. 8, 2017, 11 pages.
Non-Final Office Action received for U.S. Appl. No. 13/077,754, dated Jul. 15, 2013, 11 pages.
Non-Final Office Action received for U.S. Appl. No. 13/077,754, dated Nov. 9, 2012, 9 pages.
Notice of Allowance received for U.S. Appl. No. 11/969,796, dated Apr. 29, 2013, 13 pages.
Notice of Allowance received for U.S. Appl. No. 13/077,754, dated Sep. 18, 2015, 6 pages.
Notice of Allowance received for U.S. Appl. No. 12/217,038, dated Oct. 18, 2013, 15 pages.
Notice of Allowance received for U.S. Appl. No. 12/794,625, dated Sep. 7, 2016, 5 pages.
Notice of Allowance received for U.S. Appl. No. 13/077,711, dated Mar. 23, 2015, 8 pages.
Notice of Allowance received for U.S. Appl. No. 13/077,711, dated Nov. 28, 2014, 7 pages.
Notice of Allowance received for U.S. Appl. No. 13/217,747, dated Jan. 8, 2015, 11 pages.
Notice of Allowance received for U.S. Appl. No. 14/197,111, dated Aug. 25, 2015, 27 pages.
Office Action received for Chinese Patent Application No. 201280026797.1, dated Nov. 4, 2015, 31 pages (18 pages of English Translation and 13 pages of Official Copy).
Office Action received for Chinese Patent Application No. 2012800267971, dated Apr. 14, 2017, 18 pages (3 pages of English Translation and 15 pages of Official Copy).
Office Action received for Chinese Patent Application No. 2012800267971, dated Jul. 22, 2016, 19 pages (4 pages of English Translation and 15 pages of Official Copy).
Office Action received for European Patent Application No. 11191132.7, dated Jan. 14, 2015, 6 pages.
Office Action received for European Patent Application No. 08727399.1, dated Jun. 28, 2011, 4 pages.
Office Action received for European Patent Application No. 12726302.8, dated Jan. 22, 2016, 6 pages.
"The Textbook of the Future", Nature, vol. 458, Apr. 2, 2009, pp. 568-570.
Villamor et al., "Touch Gesture Reference Guide", available at < https://static.lukew.com/TouchGestureGuide.pdf>, Apr. 15, 2010, 7 pages.
Wang et al., "Detecting and Leveraging Finger Orientation for Interaction with Direct-Touch Surfaces", ACM, Oct. 4-7, 2009, pp. 23-32.
Willems et al., "Pen Gestures in Online Map and Photograph Annotation Tasks", Tenth International Workshop on Frontiers in Handwriting Recognition, Oct. 9, 2006, 7 pages.
Wilson, Andrew D., "TouchLight: An Imaging Touch Screen and Display for Gesture-Based Interaction", ACM, Oct. 13-15, 2004, 8 pages.
Wu et al., "Gesture Registration, Relaxation, and Reuse for Multi-Point Direct-Touch Surfaces", Proceedings of the First IEEE International Workshop on Horizontal Interactive Human-Computer Systems, 2006, 8 pages.
Appreviews, "Draw Something Free iPad App Review—CrazyMikeapps", Available Online at: <https://www.youtube.com/watch?v26-TR6hR93U>, Feb. 27, 2012, 1 page.
Brodkin, Jon, "Review: In Windows 8.1, Mail is Finally Usable on Tablets and Desktops", Ars Technica, Online available at <https://arstechnica.com/information-technology/2013/10/review-in-windows-8-1-mail-is-finally-usable-on-tablets-and-desktops/>, Oct. 17, 2013, 12 pages.
Dailytips.net, "Add CC and BCC Fields to Windows Live Mail", Daily Tech Tips & Updates, available at <http://dailytips.net76.net/?p=442>, retrieved on May 31, 2015, 5 pages.
"Evolution 2.28 User Guide", Available at <https://projects-old.gnome.org/evolution/doc/evolution228.pdf>, Jul. 2007, 173 pages.
Final Office Action received for U.S. Appl. No. 12/242,860, dated Feb. 2, 2012, 15 pages.
Final Office Action received for U.S. Appl. No. 12/242,860, dated May 16, 2013, 18 pages.
Final Office Action received for U.S. Appl. No. 12/242,860, dated Oct. 10, 2014, 18 pages.
Final Office Action received for U.S. Appl. No. 14/700,039, dated Jul. 12, 2017, 80 pages.
International Preliminary Report on Patentability received for PCT Patent Application No. PCT/US2015/028626, dated Dec. 15, 2016, 31 pages.
International Preliminary Report on Patentability received for PCT Patent Application No. PCT/US2015/045936, dated Mar. 16, 2017, 9 pages.

(56) References Cited

OTHER PUBLICATIONS

International Search Report and Written Opinion received for PCT Patent Application No. PCT/US2015/028626, dated Nov. 2, 2015, 37 pages.

International Search Report and Written Opinion received for PCT Patent Application no. PCT/US2015/045936, dated Nov. 4, 2015, 12 pages.

Invitation to Pay Additional Fees received for PCT Patent Application No. PCT/US2015/028626, dated Aug. 12, 2015, 4 pages.

Iyer, KS Sandhya, "Google Adds New Chat Box Style Compose and Reply Experience to Gmail", NDTV Gadgets360.com, Online available at <http://gadgets.ndtv.com/internet/news/google-adds-new-chat-box-style-compose-and-reply-experience-to-gmail-286779, Oct. 31, 2012, 6 pages.

Mybrana, "MyBrana 3D Tutorial", Available Online at: <https://www.youtube.com/watch?v=9CiJu9BpSR0>, Nov. 18, 2014, 1 page.

Ncmail, "Microsoft Outlook 2003 Email User's Guide", Available at <http://www.ncmail.net/documents/NCMail-Outlook-2003-Email-User-Guide-v1.0.pdf, 2007, pp. 1-40.

Non-Final Office Action received for U.S. Appl. No. 12/242,860, dated Jun. 4, 2015, 14 pages.

Non-Final Office Action received for U.S. Appl. No. 14/700,039, dated Nov. 3, 2016, 82 pages.

Non-Final Office Action received for U.S. Appl. No. 12/242,860, dated Aug. 25, 2011, 11 pages.

Non-Final Office Action received for U.S. Appl. No. 12/242,860, dated Feb. 24, 2014, 14 pages.

Non-Final Office Action received for U.S. Appl. No. 12/242,860, dated Nov. 30, 2012, 15 pages.

Notice of Allowance received for U.S. Appl. No. 12/242,860, U.S. Appl. No. Jun. 16, 2016, 11 pages.

Office Action received for Taiwanese Patent Application No. 104116112, dated Apr. 19, 2017, 89 pages (31 pages of English Translation and 58 pages of Official Copy).

Plaugic, Lizzie, "Periscope Now Lets Users Sketch Over Live Streams", Available Online at: <http://www.theverge.com/2016/4/28/11529270/periscope-sketcbing-new-feature-ios>, Apr. 28, 2016, 2 pages.

Pogue, David, "Switching to the Mac", The Missing Manual, Tiger Edition, O'Reilly Publication, 2005, 4 pages.

Postel, Jonathan B., "Simple Mail Transfer Protocol (SMTP-RFC821)", available at <http://tools.ietf.org/html/rfc821>, Aug. 1982, 73 pages.

Taylor, C., "Mailbox Launches on Andriod, Hand on", TechCrunch, XP054975992, Retrieved from the Internet, URL: https://www.youtube.com/watch?v=sgL9883T97U, Apr. 9, 2014, 1 page.

Tidwell, Jenifer, "Designing Interfaces", Section 85, magnetism, Nov. 21, 2005, 2 pages.

Appreviews, "Draw Something Free iPad App Review—CrazyMikeapps", Available Online at: <https://www.youtube.com/watch?v=26-TR6hR93U>, Feb. 27, 2012, 1 page.

Final Office Action recieved for U.S. Appl. No. 12/242,860, dated Feb. 2, 2012, 15 pages.

Final Office Action received for U.S. Appl. No. 12/242.860, dated Oct. 10, 2014, 18 pages.

Iyer, KS Sandhya, "Google Adds New Chat Box Style Compose and Reply Experience to Gmail", NDTV Gadgets360.com, Online available at <http://gadgets.ndtv.com/internet/news/google-adds-new-chat-box-style-cornpose-and-reply-experience-to-gmail-286779>, Oct. 31, 2012, 6 pages.

Ncmail, "Microsoft Outlook 2003 Email User's Guide", Available at <http://www.ncmail.net/documents/NCMail-Outlook-2003-Email-User-Guide-v1.0.pdf>, 2007, pp. 1-40.

Notice of Allowance received for U.S. Appl. No. 12/242,860, dated Jun. 16, 2016, 11 pages.

Taylor, C., "Mailbox Launches on Andriod, Hand on", TechCrunch, XP054975992, Retrieved from the Internet, URL: hrtps://mvw.youtube.comiwatch?v=sgL9883T97U, Apr. 9, 2014, 1 page.

Microsoft Word 2000 Microsoft Corporation, pages MSWord Figures 1-5, 1999.

Final Office Action received for U.S. Appl. No. 11/961,700, dated Sep. 29, 2011, 33 pages.

Non-Final Office Action received for U.S. Appl. No. 11/961,700, dated Mar. 29, 2011, 26 pages.

* cited by examiner

SWIPING FUNCTIONS FOR MESSAGING APPLICATIONS

FIELD

The described embodiments relate generally to electronic message applications. More particularly, the present embodiments relate to using a variety of physical actions to operate an electronic message application.

BACKGROUND

Modern computing devices have become one of the most popular tools for the world to communicate. Devices such as mobile phones have made it easy to talk with someone almost instantly with the click of a few buttons. The simplicity of email and text messaging has made communication between people even more instant. The popularity of various messaging services has caused a large flux of data between computing devices all over the world. In many cases, a user of a computing device can receive more messages than the user would prefer, causing the user much frustration when using the computing device. Various messaging services include folders in which to organize the numerous messages the user receives at their messaging account, however, such folders cause the user to take additional steps to organize all the messages the user receives. Moreover, even though the number of folders can often be configurable, the steps to move messages into folders and between folders typically remain the same. The problem of organizing messages is in many ways exacerbated when the messaging service enables the user to include multiple messaging accounts into a single interface, requiring the user to manage an even greater number of messages.

Once the user has received a message on a particular computing device, the user must typically open the message in order to be presented with a menu of options for moving or otherwise organizing the message. In some cases, the option that the user may be looking for is not included on the menu and therefore the user must enter one or more other menus in order to find the menu option the user is looking for. Even though particular menu options may provide a useful function, the means for reaching such menu options can spoil any benefits received from using the menu options. Moreover, when the menu option is used repeatedly, the setbacks incurred from navigating to the menu option can outweigh the utility of the menu option. In situations where a user wishes to perform multiple operations on a single message, the user may be even more burdened by a messaging service that forces the user to open and close multiple menus to perform minor organizational tasks on the message. Overall, although messaging services may be designed to make the user more efficient, executing the messaging service to be efficient may be futile at times.

SUMMARY

This paper describes various embodiments that relate to operating and controlling a message application using various physical actions performed at a user interface. In some embodiments, a method for controlling a message application is set forth. The method includes determining that a message, from a list of applications, is being swiped, and determining a starting point of the swipe. The method can further include a step of determining whether the swipe was performed in a first direction or a second direction from the starting point. Additionally, the method can include, when an end point of the swipe causes a portion of the message, perpendicular to the direction of the swipe, to be between an option threshold and a function threshold, causing a user interface to display a first button and a second button. The first button can be capable of initiating a first action that is configurable by a user of the message application, and the second button can be capable of initiating a second action that is restricted from being configured by the user.

In other embodiments, a machine-readable non-transitory storage medium is set forth. The storage medium can store instructions that, when executed by a processor included in a computing device, cause the computing device to carry out steps that include determining that a message is being swiped across a user interface of the computing device. Additionally, the steps can include determining a swipe direction associated with the message being swiped, and determining a swipe distance corresponding to the distance a message has been moved across the user interface. The steps can further include, when the swipe direction is in a first direction and the swipe distance satisfies a function threshold: performing a first function associated with the first direction, and causing the message to be removed from the user interface. Moreover, the steps can include, when the swipe direction is in a second direction that is different than the first direction and the swipe distance satisfies function threshold: performing a second function associated with the second direction, and causing the message to return to an original position on the user interface.

In yet other embodiments, a device is set forth. The device can include a processor, and a memory storing instructions that when executed by the processor cause the processor to perform the steps of: determining that a swipe is occurring across a user interface of the device, while the user interface is displaying a list of messages, and determining that a message from the list of messages that is being swiped. The steps can further include, when a distance of the swipe satisfies an option threshold, causing a plurality of option buttons to be displayed on the user interface, wherein the plurality of option buttons correspond to operations that can be performed on the message. Additionally, the steps can include, when the distance of the swipe satisfies a function threshold: causing the plurality of option buttons to be removed from the user interface, and performing a function on the message.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
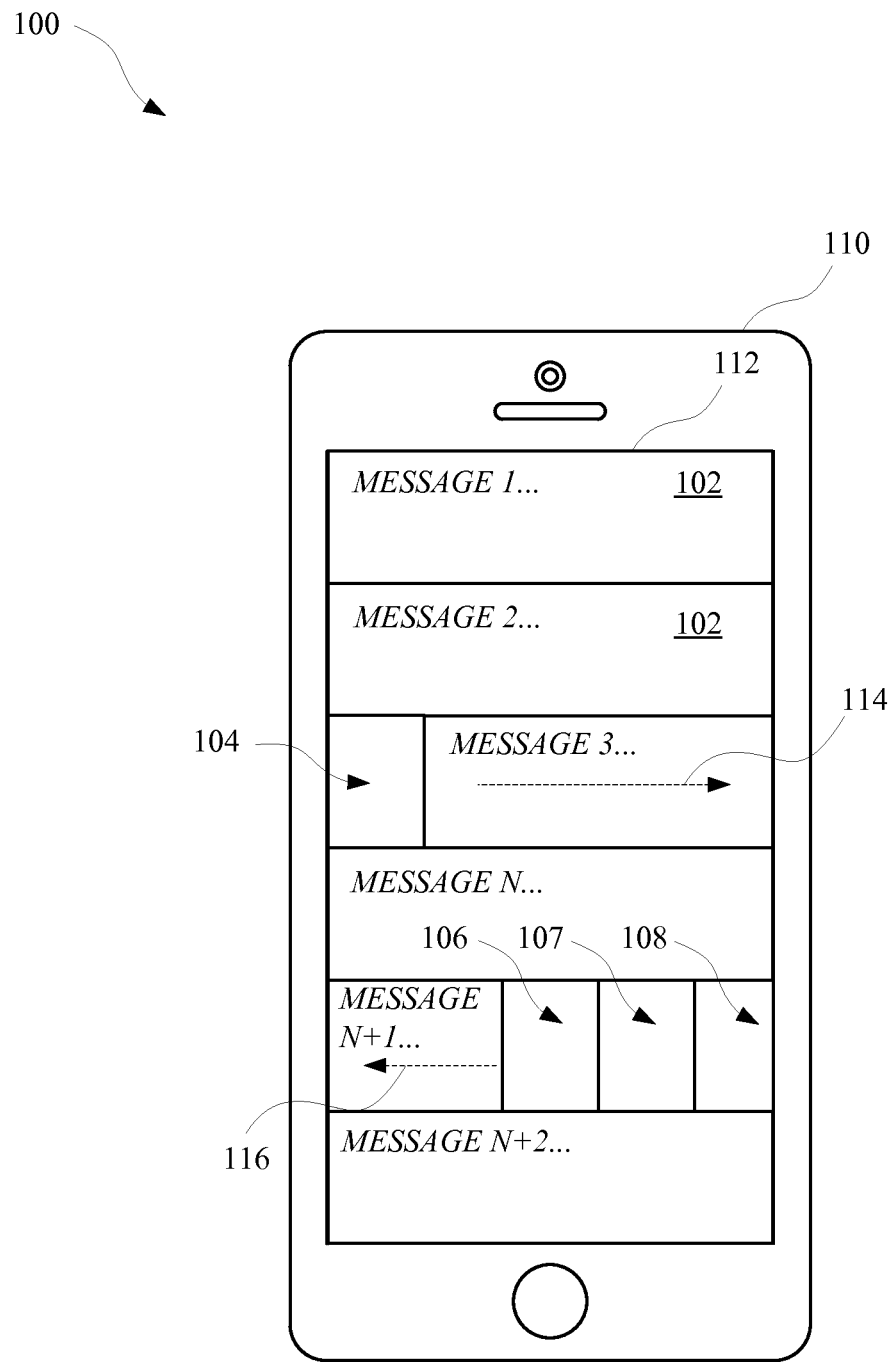
FIG. 1 illustrates a diagram of a mobile device having a messaging interface for displaying and organizing messages.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments discussed herein relate to performing organizational tasks on electronic messages in a message application. The organizational tasks can be activated using a variety of physical operations at a user interface of a mobile device. The physical operations can include swiping operations in which a user moves their finger, or other suitable object, across the user interface and a message being displayed on the user interface. The swipe can initiate or complete an operation such as deleting a message, moving a message, marking a message as unread, copying a message to another folder, or any other suitable operation related to organizing electronic messages. The type of swipe can determine the operation that is to be performed on a given message. In some embodiments, a partial right swipe and a partial left swipe can reveal multiple buttons for a user to choose from. The buttons that are exposed can be different for the partial right swipe and the partial left swipe. For example, the buttons that are exposed during a partial right swipe can be an archive button and a trash button, while the buttons exposed during a partial left swipe can be a mark as unread button, a copy to folder button, and a more button for seeing other operation choices not listed. The various swipes, functions, and/or buttons resulting from the different swipes can be configurable by a user (e.g., both left and right swipes). Additionally, in some embodiments, the buttons exposed during a partial right swipe can be configurable by a user while the buttons exposed during a partial left swipe can be non-configurable, or vice a versa. Other organizational tasks can be executed by performing a full right swipe or a full left swipe. Similar to the aforementioned buttons, the organizational task executed by the full right swipe can be configured by the user while the full left swipe can be non-configurable, or vice versa.

Thresholds can be established for differentiating between what constitutes a partial swipe and a full swipe. The thresholds can be configurable by a user, or non-configurable by a user in some embodiments. Animations or images can be associated with each threshold in order to put the user on notice of when they have or have not satisfied a threshold associated with a particular type of swipe, or a particular type of organizational task. Moreover, after a particular threshold is satisfied during a swipe, the message can remain in a shifted position, adjacent to one or more buttons, until the user presses a button or otherwise provides an indication of an operation to perform or not perform at the mobile device. For example, the user can tap the shifted message to not perform a function, continue swiping to execute a function associated with a particular full swipe, or press a button adjacent to the shifted message. When the user has multiple message accounts, each message account can have different settings related to swipe procedures. For example, the full right swipe in one message account can be a mark as unread operation, while the full right swipe in another message account can be an archive operation.

These and other embodiments are discussed below with reference to FIGS. 1-8; however, those skilled in the art will readily appreciate that the detailed description given herein with respect to these figures is for explanatory purposes only and should not be construed as limiting.

FIG. 1 illustrates a diagram 100 of a mobile device 110 having a messaging interface 112 for displaying and organizing messages 102. Specifically, FIG. 1 illustrates the messaging interface 112 having multiple organizational functions that can be performed and revealed by performing a swiping motion against the messaging interface 112. A user of the mobile device 110, by placing a finger, or any other suitable instrument, against the messaging interface 112 and sliding the finger across the messaging interface 112 can perform the swiping motion. A right swipe 114 can be performed and cause a right function to be performed that is different than a left function that a left swipe 116 performs, as further discussed herein. The right swipe 114 can also reveal a right swipe option 104, which the user can press in order to perform a function associated with the right swipe option 104. The left swipe 116 can also reveal left swipe options, and specifically the left swipe 116 can reveal multiple configurable options 106 and 107, and a non-configurable option 108. The configurable options 106 and 107 can be modified by the user, a third party, or the mobile device 110 manufacturer, and the non-configurable option 108 can be non-configurable. Both the left swipe 116 and the right swipe 114 can reveal one or more swipe options that can include one or more configurable, or non-configurable options, or any combination thereof. Additionally, left swipes 116 and right swipes 114 can each be performed in isolation or concurrently. For example, the user can use two fingers to swipe two messages concurrently. One message can receive a left swipe 116 and the other can receive a right swipe 114. Both the left swipe 116 and right swipe 114 can be performed to accomplish the right function and the left function concurrently. These and other embodiments are discussed further herein.

Figure 2:
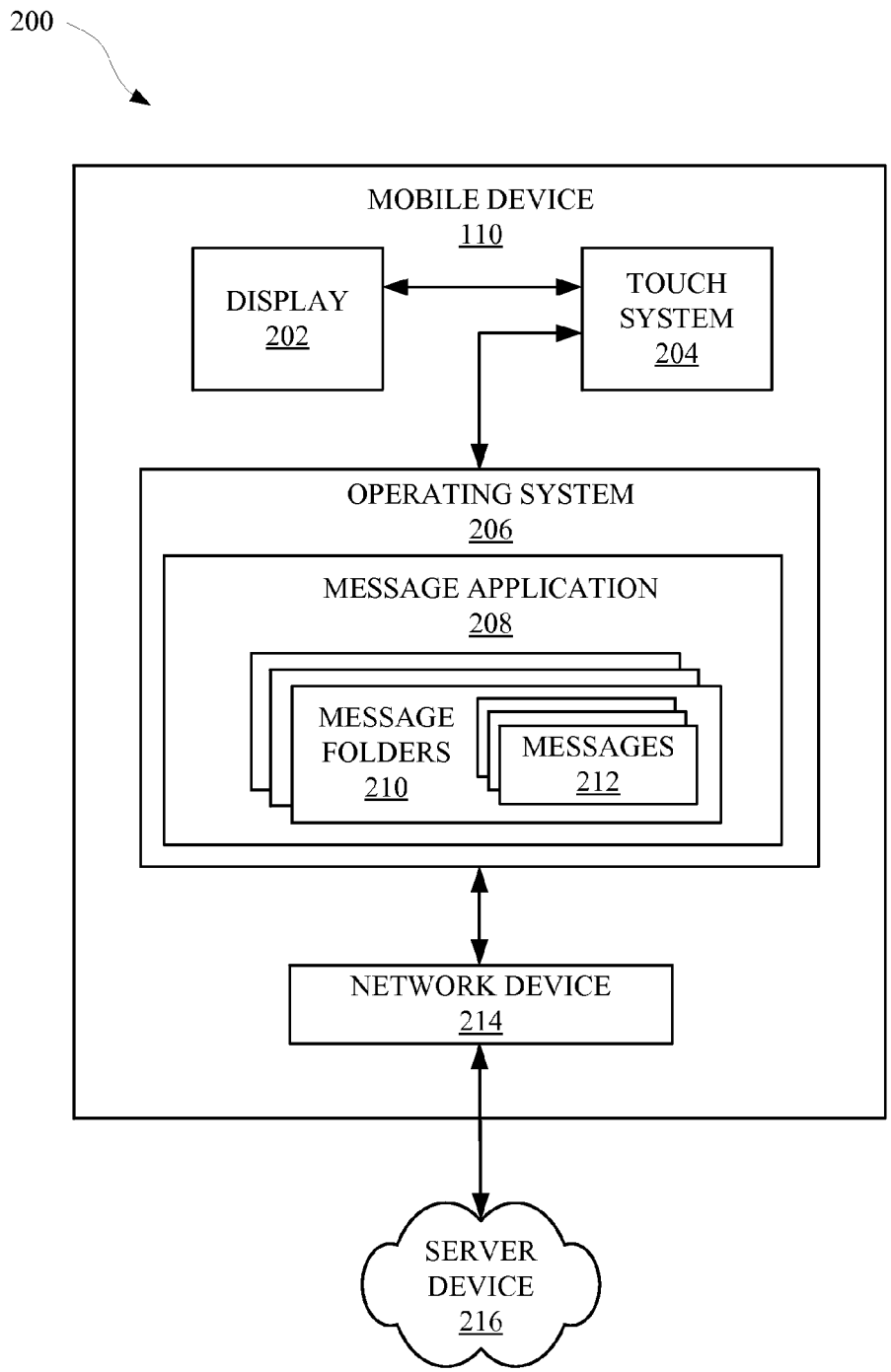
FIG. 2 illustrates a system for operating the messaging interface on the mobile device according to some embodiments discussed herein.

FIG. 2 illustrates a system 200 for operating the messaging interface 112 on the mobile device 110 according to some embodiments discussed herein. The mobile device 110 can include a display 112 that is used to transmit touch-related data to and from a touch system 204. The touch system 204 interprets the touch-related data in order to determine what operations the user is intending to perform, and thereafter provide a touch signal indicative of the operation to an operating system 206. The touch signal can include the direction the user is swiping across the messaging interface 112, the speed at which the swipe is occurring, the length of time the swipe was accomplished in, coordinates of the swipe that can include a starting coordinate and an ending coordinate, velocity and acceleration of the swipe, coordinates of a tap on the messaging interface 112, the number of taps, the frequency of the taps within a particular period of time, and any other suitable data related to touching a touch-screen display. The operating system 206 can use the touch signals to operate a message application 208. The message application 208 can be an email application, text message service, or any suitable program for receiving or managing electronic messages. The message application 208 can include one or more message folders 210 that can store one or more messages 212. The messages 212 can be moved to and from various folders, or deleted, based on the touch signal, as further discussed herein.

Figure 3A:
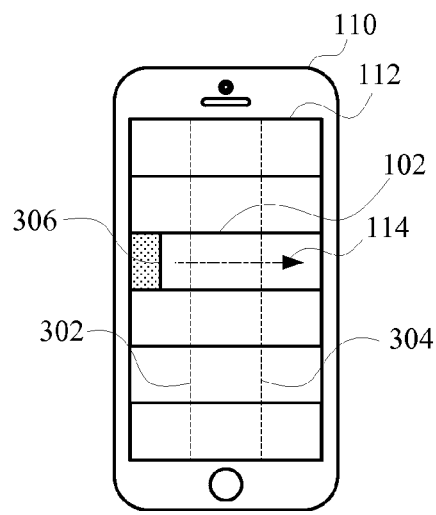
FIGS. 3A-3D illustrate multiple diagrams of the various operations of the right swipe that can occur on the message interface of the mobile device.

FIGS. 3A-3D illustrate multiple diagrams of the various operations of the right swipe 114 of the message interface 112 on the mobile device 110. Specifically, FIGS. 3A-3D illustrate embodiments of the message interface 112 including an option threshold 302 and a function threshold 304. The option threshold 302 and function threshold 304 can be values stored by the operating system 206, touch system 204, or message application 208, in order to coordinate various operations of the message interface 112 with the message application 208. The thresholds can be distances between coordinates or points on the message interface 112. For example, the option threshold 302 can be a distance value corresponding to the distance between a side of the message interface 112 and the option threshold 302; and the option threshold 302 can be satisfied when a distance of a swipe is equal to or greater than the distance value. Additionally, in some embodiments, the option threshold 302 and function threshold 304 can be met if the swipe is longer than a first predetermined number of pixels and the swipe ends within a second predetermined number of pixels from an edge of the message interface 112. In this way, if the swipe is not longer than the first predetermined threshold but the swipe ends within the second predetermined threshold, no resulting operation will result (unless the swipe in some way satisfies another predetermined set of thresholds associated with an operation). In FIG. 3A, a left status bar 306 is provided to indicate that an operation can be performed when the right swipe 114 pulls or moves a message 102 such that the left side of the message 102 moves toward the option threshold 302. When the left side of the message 102 does not reach or satisfy the option threshold 302 during a right swipe 114, and the user terminates the right swipe 114 (e.g., stops touching the message interface 112), the left side of the message 102 can return to a starting position or original position at the left side of the message interface 112. As a result, no operation is performed on the message 102 when the right swipe 114 does not cause the left side of the message 102 to reach, exceed, or otherwise satisfy the option threshold 302. The left status bar 306 will be displayed during the course of the right swipe 114 until the left side of the message 102 reaches, exceeds, or otherwise satisfies the option threshold 302. The left status bar 306 can be a color, pattern, or animation, or any other suitable signal indicating that an operation or function will not be performed.

Figure 3B:
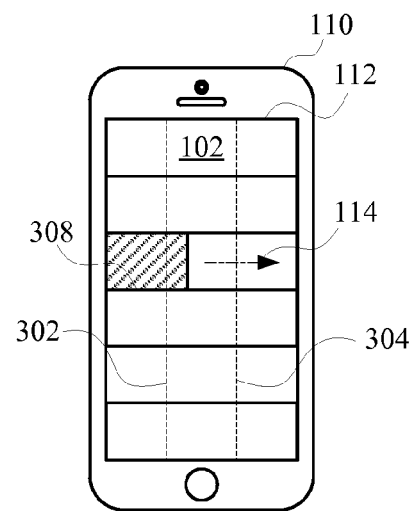
Figure 3C:
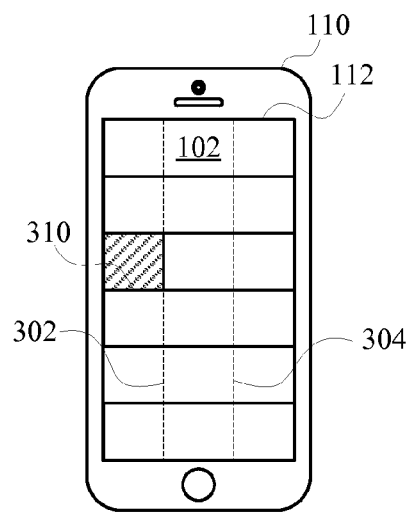

In FIG. 3B, the right swipe 114 is illustrates as causing the left side of the message 102 to extend beyond the option threshold 302 but not beyond the function threshold 304. Going beyond a particular threshold can refer to when a portion of a message 102 (e.g., the left side) starts at one side of the threshold (e.g., the left side) and is either caused to reach the threshold or move past the threshold (e.g., move to the right side of the threshold). When the left side of the message extends beyond the option threshold 302, the option status bar 308 can appear indicating that if the user releases their finger or instrument from the message interface 112 the option status bar 308 will remain and display an option button 310, illustrated in FIG. 3C, for the user to select. The option button 310 can be predetermined by the mobile device 110 manufacturer or can be configurable by the user in some embodiments. For example, the option button 310 can be configure to archive a message 102, mark a message 102 as unread, move a message 102 to a specified folder, report a message 102 as spam, forward a message 102 to a specific person, mark a message 102 as important, or perform any other suitable operation related to message management.

Figure 3D:
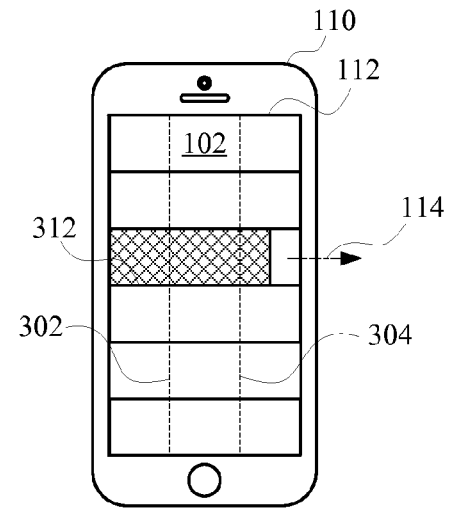

FIG. 3D illustrates the left side of a message 102 being moved past the function threshold 304. When the left side of the message 102 is moved past the function threshold 304, a function status bar 312 is displayed at the message interface 112 indicating that the user has moved the message 102 far enough across the message interface 112 to enable a function to be performed on the message 102. The function performed can be any of the operations or functions described herein, or any other suitable function related to message management. For example, moving the left side of the message 102 to a position at or past the function threshold 304 can cause the message to be archived, marked as unread, or moved to a different folder according to some embodiments. Moreover, the function that is performed can be configurable or non-configurable by a user in some embodiments.

Figure 4:
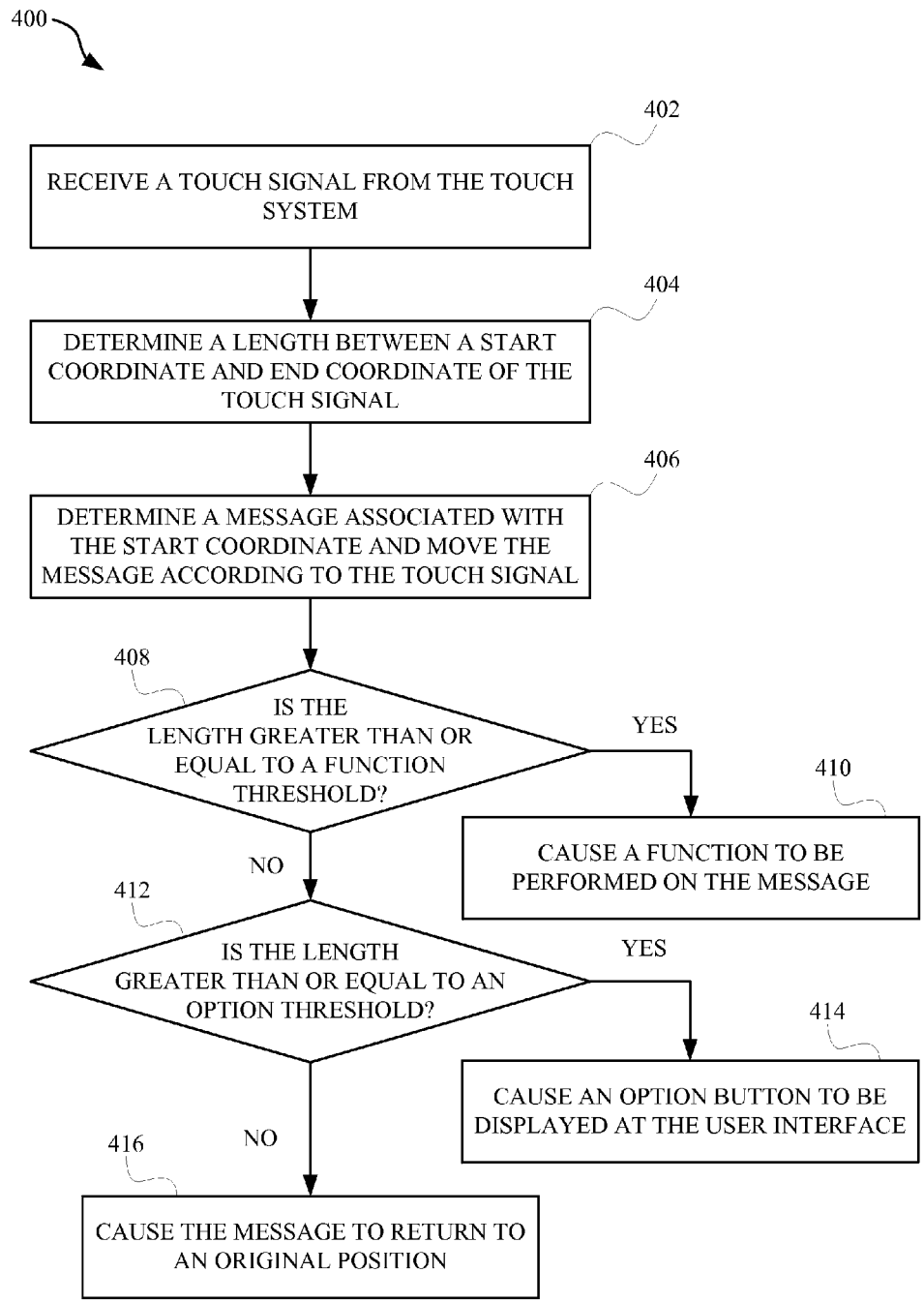
FIG. 4 illustrates a method for operating the right swipe according to some embodiments discussed herein.

FIG. 4 illustrates a method 400 for operating the right swipe 114 according to some embodiments discussed herein. Specifically, FIG. 4 illustrates a method 400 for operating the message application 208 using the right swipe 114 operation. At step 402, the message application 208 can receive a touch signal from the touch system 204. The touch signal can originate at a display device of the mobile device 110 and thereafter be converted to a touch signal that is usable by the message application 208. At step 404, the message application 208 can determine a length between a start coordinate and end coordinate associated with the touch signal. In some embodiments, a velocity and acceleration associated with the touch signal can be measured, and thereafter the velocity and/or acceleration can be used by the message application 208 to determine an operation and/or function to perform according to the velocity or acceleration. The function can be performed when the swipe being performed reaches a predetermined velocity or acceleration in some embodiments. Moreover, the operation and/or function to be performed can be determined based on the end coordinate of the touch signal and an edge of the message interface 112. In some embodiments, the operation and/or function to be performed can be determined based on a combination of length, speed, and/or the end coordinate of the touch signal relative to the edge of the message interface 112. At step 406, the message application 208 can determine a message 102 that is associated with the start coordinate and move the message 102 according to the touch signal. The message 102 associated with the start coordinate can be the message 102 that the user intends to modify or otherwise perform an operation on. Moving the message 102 can involve causing the display to provide the appearance that the message 102 is being shifted across the screen at a velocity that is proportional to the velocity associated with the touch signal or movement of the finger or other instrument of the user.

The method 400 can include a step 408 where the message application 208 determines whether the length, previously determined at step 404, is greater than or equal to a function threshold. If the length is greater than or equal to a function threshold, the message application 208 can cause a function to be performed on the message 410, as further discussed herein. If the length is not greater than or equal to the function threshold, the message application 208 can proceed to step 412 where the message application 208 determines whether the length is greater than or equal to an option threshold. If the length is greater than or equal to the option threshold, the message application can, at step 414, cause an option button to be displayed at the user interface. The option button can appear adjacent to a modified message 102, which can appear shifted to the right in order to allow the option to be adequately displayed. Otherwise the message application 208 can proceed to step 416 where the message application 208 can cause the message 102 to return to an original position. The original position can be the position that the user initially views a message 102 prior to initiating any operation on the message 102.

Figure 5A:
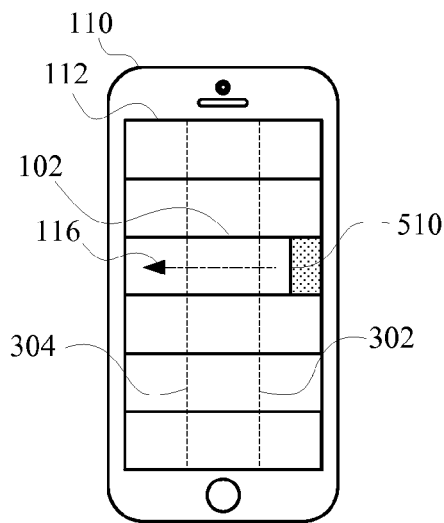
FIGS. 5A-5D illustrate multiple diagrams of the various operations of the left swipe that can occur on the message interface on the mobile device.
Figure 5B:
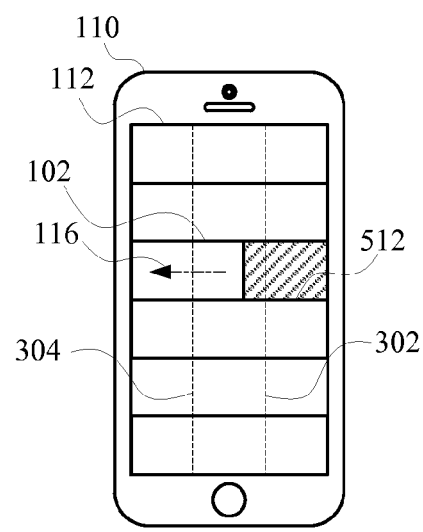

FIGS. 5A-5D illustrate multiple diagrams of the various operations of the left swipe 116 of the message interface 112 on the mobile device 110. The diagrams of FIGS. 5A-5D incorporate many of the elements of FIGS. 3A-3D, however, FIGS. 5A-5D are set forth to illustrate operations and functions related to the left swipe 116 according to some embodiments discussed herein. In FIG. 5A, the left swipe 116 can be used to reveal a right status bar 510, which can indicate that an operation or function can be performed if the user continues to perform the left swipe 116. In FIG. 5B, as the user continues to perform the left swipe 116 and the right side of the message 102 passes the option threshold 302, an option status bar 512 can be displayed that can include one or more indicators of the operations that can be performed if the user releases the left swipe 116. The option threshold 302 and function threshold 304 can swap places depending on the direction of the swipe. For example, if the user is performing a left swipe 116, the option threshold 302 can be on the right side of the function threshold 304; and if the user is performing a right swipe 114, the option threshold 302 can be on the left side of the function threshold 304 (as displayed in FIGS. 3A-3D and 5A-5D, respectively). If the user releases the left swipe 116 at a point where the right side of the message 102 is between the option threshold 302 and the function threshold 304, the right side of the message 102 will remain static until the user touches the message interface 112 again. In any of the embodiments discussed herein, the option threshold 302 and function threshold 304 can be moved or otherwise adjusted by a user, together or individually, in order to provide different thresholds for functions and operations to occur as a result of a particular swipe. Additionally, the resulting functions and options of the left swipe 116 can be performed by a right swipe 114, or vice a versa, based on a user preference, the frequency the user executes a particular swipe direction, or the dexterity of the user.

Figure 5C:
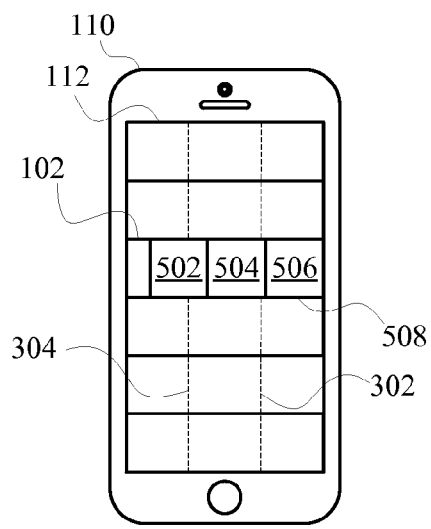
Figure 5D:
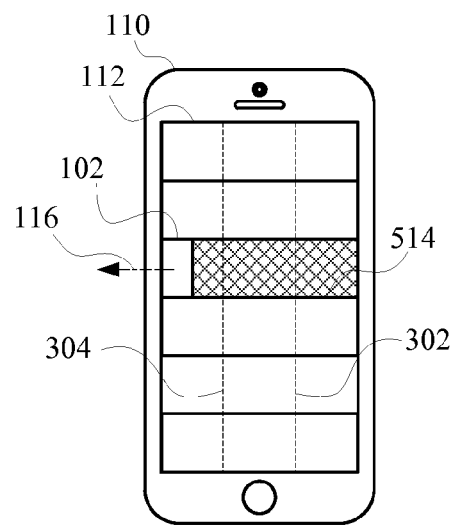

FIG. 5C illustrates an embodiment of the message interface 112 where the message 102 is in a static position as a result of a swipe. Specifically, FIG. 5C illustrates how multiple options for operations are displayed as a result of a left swipe 116 that was terminated at a point when the right side of the message 102 was between the option threshold 302 and the function threshold 304. It should be noted that a message 102 can refer to an icon or other representation of a message 102 that is not the actual stored message but rather a symbol of the message. A user can be provided with an operation list 508 that the user can choose a single operation from. In some embodiments, the operation list 508 can include a non-configurable option button 502, a first configurable option button 504, and a second configurable option button 506. In some embodiments, more non-configurable and/or configurable options can be provided for the user to select from. Additionally, more or less than three options can be provided to the user to choose from. For example, a left swipe 116 can provide three options while a right swipe 114 can provide one option. The non-configurable option button 502, first configurable option button 504, and second configurable option button 506 can be any option or function discussed herein, or any other suitable operation for managing electronic messages. The operation list 508 can be different for each message account the user has. Therefore, if the user has three message accounts from which the user receives messages, the operation list 508 can be configured for each of the three message accounts. Once the operation list 508 has been transitioned into a static position by a swipe, the operation list 508 can remain static until a user touches the message interface 112 again. The user can also re-touch the message 102 that has been dragged to the left by the left swipe 116 and continue the left swipe 116 in order to perform a function that has been configured for the left swipe 116. However, the right side of the message 102 must first reach or move past the function threshold 304 in order for the function associated with the left swipe 116 to be executed, as illustrated in FIG. 5C. In FIG. 5C, a function status bar 514 is displayed when the right side of the message 102 reaches or moves past the function threshold 304. Thereafter, the function associated with the left swipe 116 can be executed on the message 102 by the message application 208. It should be noted that any of the functions associated with the left swipe 116 can also be performed by the right swipe 114, and vice a versa.

Figure 6:
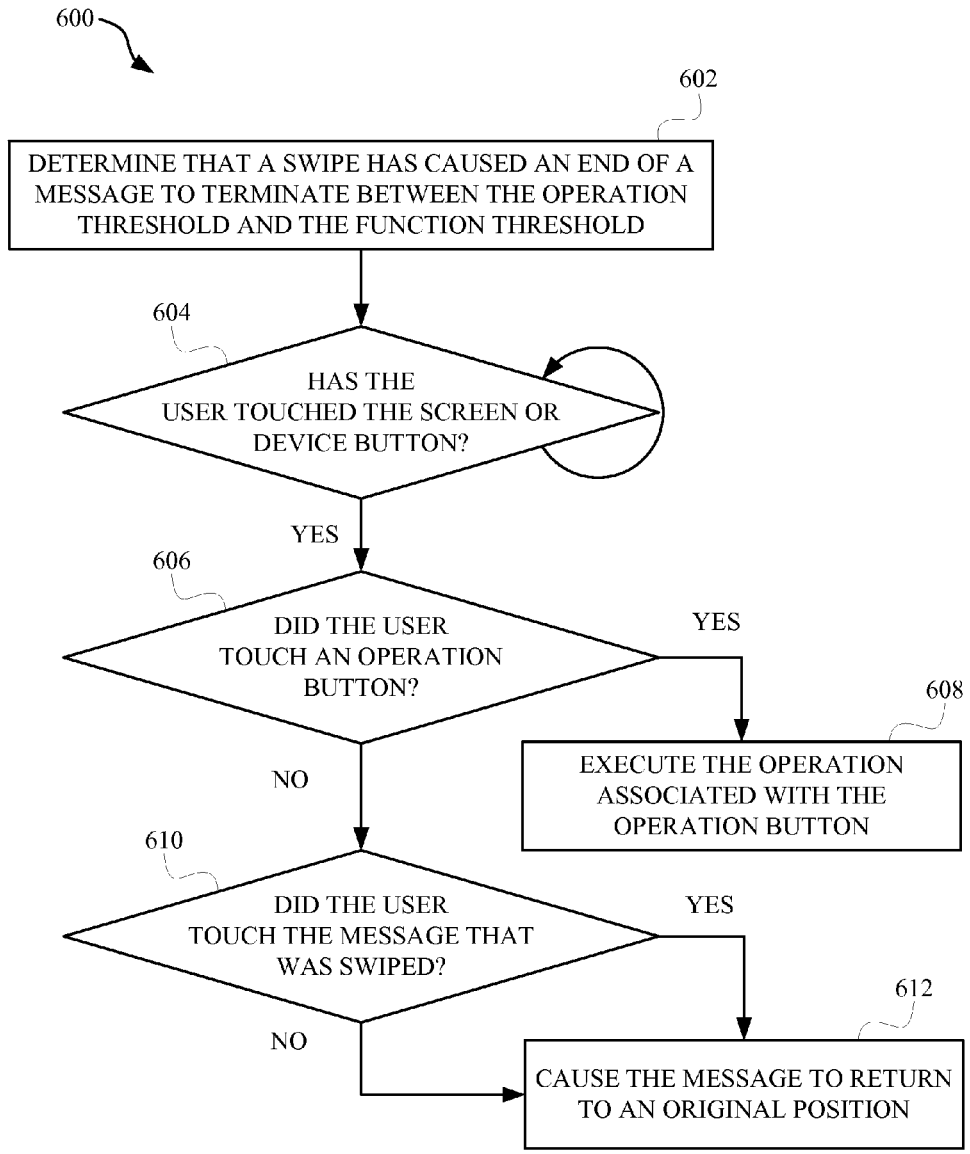
FIG. 6 illustrates a method for operating the message application after the user has swiped the message to a position where the user is provided with operation choices, as further discussed herein.

FIG. 6 illustrates a method 600 for operating the message application 208 once the user has swiped the message 102 to a position where the user is provided operation choices, as discussed herein. At step 602, the message application 208 determines that a swipe has caused an end of the message 102 to reside between the option threshold 302 and the function threshold 304. At step 604, the message application 208 determines, in a loop, whether the user has touched the screen or other device button of the mobile device 110. Upon the user touching the screen or other device button of the mobile device 110, the message application 208, at step 604, determines whether the user touched an option button 504 (i.e., a button revealed when the user performs a left swipe 116 or right swipe 114 as discussed herein). If the user has selected an operation button, the message application 208 can proceed to step 608 where the message application 208 executes the operation associated with the operation button (e.g., archiving the message). If the user has not selected on operation button, the message application 208 can proceed to step 610 where the message application 208 determines whether the user touched the message 102 that was previously determined to have been swiped at step 602. If the user touched the message that was previously swiped, the message application 208 can proceed to step 612 where the message 102 is caused to return to an original position on the display, as discussed herein. If the user continues to swipe the message 102 to perform a full swipe, the function associated with the full swipe can be performed on the message. Otherwise, the message application 208 can cause the message 102 to return to the original position on the display if the user did not select an operation button. In this way, touching any portion of the display outside of the operation button(s) can act as a cancellation procedure for the respective swipe. It should be noted that the methods and steps described herein can be modified according to any of the embodiments described herein, and arranged in any suitable manner or order.

Figure 7:
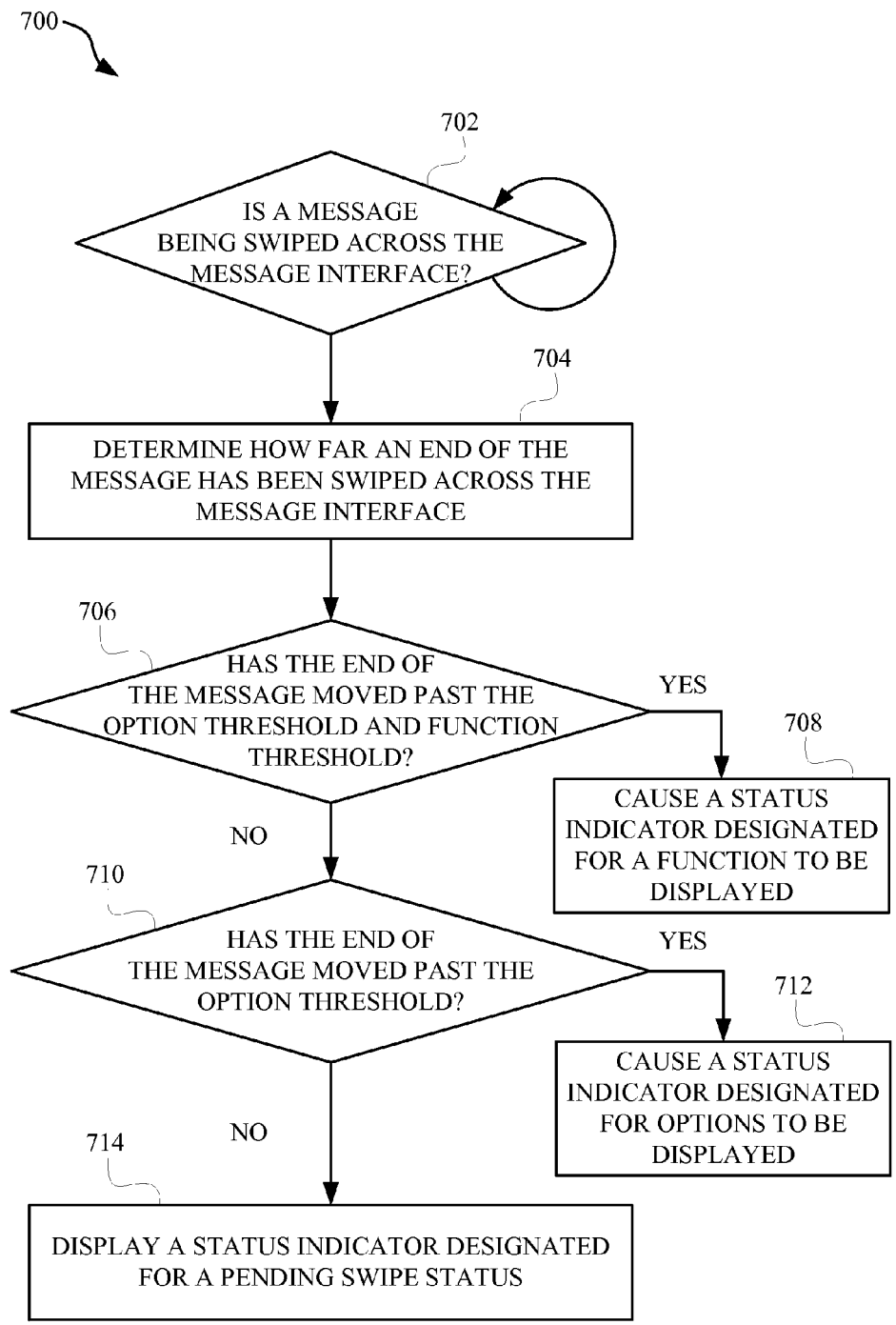
FIG. 7 illustrates a method for displaying a status of a swipe, as further discussed herein.

FIG. 7 illustrates a method 700 for displaying a status of a swipe. Specifically, FIG. 7 illustrates the method 700 for notifying the user of particular functions and operations that are available as the user swipes a message across the message interface 112. At step 702, the message application 208 determines whether a message 102 is being swiped across the message interface 112. Step 702 is continually performed until the message application 208 determines that a message 102 is being moved across the message interface 112, and thereafter the message application 208 proceeds to step 704. At step 704, the message application 208 determines how far an end of the message 102 has been swiped across the message interface 112. This determination can be made using any suitable algorithm, such as by calculating the length of the swipe. At step 706, the message application 208 determines whether the end of the message 102 has moved past the option threshold 302 and function threshold 304, or whether the length of the swipe is longer than the option threshold 302 and function threshold 304 as discussed herein. If the message 102 has moved past the option threshold 302 and the function threshold 304, the message application 208 can cause a status indicator designated for a function to be displayed at step 708. If the message 102 has not moved past the option threshold 302 and the function threshold 304, the message application 208 can, at step 710, determine whether the end of the message 102 has moved only past the option threshold 302. If the end of the message 102 has moved past or satisfied the option threshold 302, the message application 208 can, at step 712, cause a status indicator designated for options to be displayed. If the end of the message 102 has not moved past or not satisfied the option threshold 302, the message application 208 can, at step 714, display a status indicator designated for a pending swipe status. Each status indicator discussed herein can be an image, text, animation, or any other suitable notification for putting the user on notice of the status of the respective swipe being performed.

Figure 8:
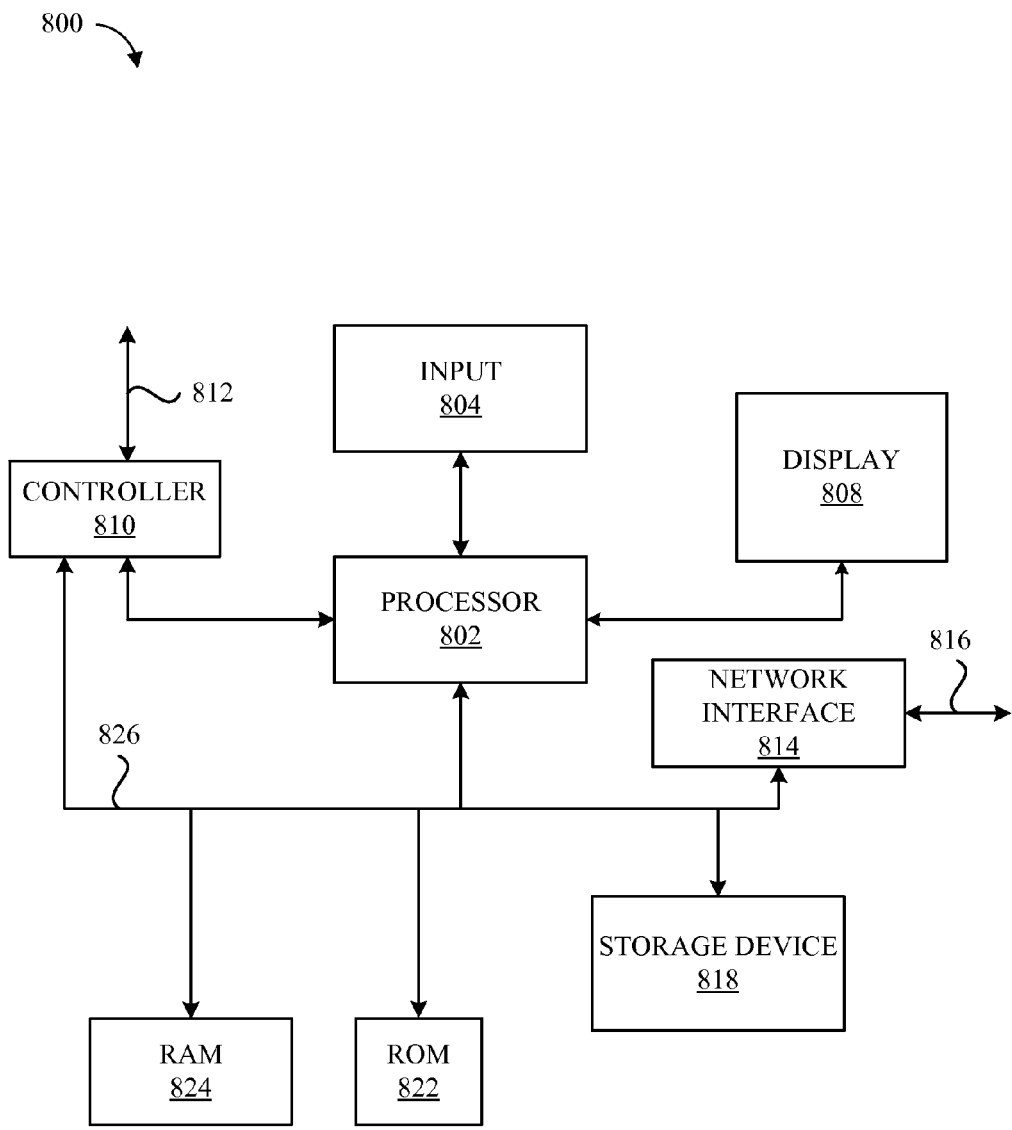
FIG. 8 is a block diagram of a computing device that can represent the components of the mobile device.

FIG. 8 is a block diagram of a computing device 800 that can represent the components of the mobile device 110. It will be appreciated that the components, devices or elements illustrated in and described with respect to FIG. 8 may not be mandatory and thus some may be omitted in certain embodiments. The computing device 800 can include a processor 802 that represents a microprocessor, a coprocessor, circuitry and/or a controller 810 for controlling the overall operation of computing device 800. Although illustrated as a single processor, it can be appreciated that the processor 802 can include a plurality of processors. The plurality of processors can be in operative communication with each other and can be collectively configured to perform one or more functionalities of the computing device 800 as described herein. In some embodiments, the processor 802 can be configured to execute instructions that can be stored at the computing device 800 and/or that can be otherwise accessible to the processor 802. As such, whether configured by hardware or by a combination of hardware and software, the processor 802 can be capable of performing operations and actions in accordance with embodiments described herein.

The computing device 800 can also include user input device 804 that allows a user of the computing device 800 to interact with the computing device 800. For example, user input device 804 can take a variety of forms, such as a button, keypad, dial, touch screen, audio input interface, visual/image capture input interface, input in the form of sensor data, etc. Still further, the computing device 800 can include a display 808 (screen display) that can be controlled by processor 802 to display information to a user. Controller 810 can be used to interface with and control different equipment through equipment control bus 812. The computing device 800 can also include a network/bus interface 814 that couples to data link 816. Data link 816 can allow the computing device 800 to couple to a host computer or to accessory devices. The data link 816 can be provided over a wired connection or a wireless connection. In the case of a wireless connection, network/bus interface 814 can include a wireless transceiver.

The computing device 800 can also include a storage device 818, which can have a single disk or a plurality of disks (e.g., hard drives) and a storage management module that manages one or more partitions (also referred to herein as "logical volumes") within the storage device 818. In some embodiments, the storage device 820 can include flash memory, semiconductor (solid state) memory or the like. Still further, the computing device 800 can include Read-Only Memory (ROM) 822 and Random Access Memory (RAM) 822 and. The ROM 822 can store programs, code, instructions, utilities or processes to be executed in a non-volatile manner. The RAM 824 can provide volatile data storage, and stores instructions related to components of the storage management module that are configured to carry out the various techniques described herein. The computing device can further include data bus 826. Data bus 826 can facilitate data and signal transfer between at least processor 802, controller 810, network interface 814, storage device 818, ROM 822, and RAM 824.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a user to manage messages within a user interface of a message application, the method comprising:
   detecting a swipe gesture on a message icon among a list of message icons, wherein each message icon is associated with at least one corresponding message;
   in accordance with a first determination that an end point of the swipe gesture is between a first threshold and a second threshold:
      displaying a first affordance and a second affordance within the user interface, wherein;
      the first affordance is a user-configurable affordance associated with a first message action selected from at least one message action, and when the first affordance is activated, the first message action is performed on the at least one corresponding message, and
      the second affordance is a non-user-configurable affordance that is associated with a second message action to be performed on the at least one corresponding message when the end point of the swipe gesture exceeds the second threshold.

2. The method of claim 1, further comprising:
   in accordance with a second determination that the end point of the swipe gesture exceeds the second threshold, performing the second message action on the at least one corresponding message.

3. The method of claim 1, further comprising:
   causing, during the swipe gesture, a status image to be displayed adjacent to an end portion of the message icon, before and after the end portion of the message icon moves past the first threshold and the second threshold.

4. The method of claim 1, wherein, when the swipe gesture causes an end portion of the message icon to move past the first threshold and the second threshold, and then between the first threshold and the second threshold, the method further comprises:
   causing a function status image to be displayed, and
   causing the first affordance and the second affordance to be displayed.

5. The method of claim 1, wherein the first message action involves: marking the at least one corresponding message as unread, moving the at least one corresponding message to a trash folder, marking the at least one corresponding message as important, moving the at least one corresponding message to a different folder, copying the at least one corresponding message to a different folder, and forwarding the at least one corresponding message to a recipient.

6. The method of claim 1, wherein, when the end point of the swipe gesture causes an end portion of the message icon to move toward the first threshold without passing the first threshold, the method further comprises:
   determining whether the swipe gesture is being performed in a first direction or a second direction;
   when the user is performing the swipe gesture in the first direction:
      causing the user interface to display a first swipe status;
   when the user is performing the swipe gesture in the second direction:
      causing the user interface to display a second swipe status.

7. The method of claim 1, wherein, when the end point of the swipe gesture causes an end portion of the message icon to move toward the first threshold without passing the first threshold, the method further comprises:
   determining whether the swipe gesture is being performed in a first direction or a second direction;
   designating the first threshold to be on a first side of the second threshold when the user is performing the swipe gesture in the first direction;
   otherwise, designating the first threshold to be on a second side of the second threshold when the user is performing the swipe gesture in the second direction.

8. A non-transitory computer readable storage medium configured to store instructions that, when executed by a processor included in a computing device, cause the computing device to enable a user to manage messages within a user interface of a message application, by carrying out steps that include:
   detecting a swipe gesture on a message icon among a list of message icons, wherein each message icon is associated with at least one corresponding message;
   in accordance with a first determination that an end point of the swipe gesture is between a first threshold and a second threshold:
      displaying a first affordance and a second affordance within the user interface, wherein:
      the first affordance is a user-configurable affordance associated with a first message action selected from at least one message action, and when the first affordance is activated, the first message action is performed on the at least one corresponding message, and
      the second affordance is a non-user-configurable affordance that is associated with a second message action to be performed on the at least one corresponding message when the end point of the swipe gesture exceeds the second threshold.

9. The non-transitory computer readable storage medium of claim 8, wherein the steps further include:
   in accordance with a second determination that the end point of the swipe gesture exceeds the second threshold, performing the second message action on the at least one corresponding message.

10. The non-transitory computer readable storage medium of claim 8, wherein the steps further include:
    causing, during the swipe gesture, a status image to be displayed adjacent to an end portion of the message icon, before and after the end portion of the message icon moves past the first threshold and the second threshold.

11. The non-transitory computer readable storage medium of claim 8, wherein, when the swipe gesture causes an end portion of the message icon to move past the first threshold and the second threshold, and then between the first threshold and the second threshold, the steps further include:
    causing a function status image to be displayed, and
    causing the first affordance and the second affordance to be displayed.

12. The non-transitory computer readable storage medium of claim 8, wherein the first message action involves: marking the at least one corresponding message as unread, moving the at least one corresponding message to a trash folder, marking the at least one corresponding message as important, moving the at least one corresponding message to a different folder, copying the at least one corresponding message to a different folder, and forwarding the at least one corresponding message to a recipient.

13. The non-transitory computer readable storage medium of claim 8, wherein, when the end point of the swipe gesture causes an end portion of the message icon to move toward the first threshold without passing the first threshold, the steps further include:
  determining whether the swipe gesture is being performed in a first direction or a second direction;
  when the user is performing the swipe gesture in the first direction:
    causing the user interface to display a first swipe status;
  when the user is performing the swipe gesture in the second direction:
    causing the user interface to display a second swipe status.

14. The non-transitory computer readable storage medium of claim 8, wherein, when the end point of the swipe gesture causes an end portion of the message icon to move toward the first threshold without passing the first threshold, the steps further include:
  determining whether the swipe gesture is being performed in a first direction or a second direction;
  designating the first threshold to be on a first side of the second threshold when the user is performing the swipe gesture in the first direction;
  otherwise, designating the first threshold to be on a second side of the second threshold when the user is performing the swipe gesture in the second direction.

15. A computing device configured to enable a user to manage messages within a user interface of a message application, the computing device comprising a processor configured to cause the computing device to carry out steps that include:
  detecting a swipe gesture on a message icon among a list of message icons, wherein each message icon is associated with at least one corresponding message;
  in accordance with a first determination that an end point of the swipe gesture is between first threshold and a second threshold:
    displaying a first affordance and a second affordance within the user interface, wherein:
      the first affordance is a user-configurable affordance associated with a first message action selected from at least one message action, and when the first affordance is activated, the first message action is performed on the at least one corresponding message, and
      the second affordance is a non-user-configurable affordance that is associated with a second message configurable action to be performed on the at least one corresponding message when the end point of the swipe gesture exceeds the second threshold.

16. The computing device of claim 15, wherein the steps further include; in accordance with a second determination that the end point of the swipe gesture exceeds the second threshold, performing the second message action on the at least one corresponding message.

17. The computing device of claim 15, wherein the steps further include: causing, during the swipe gesture, a status image to be displayed adjacent to an end portion of the message icon, before and after the end portion of the message icon moves past the first threshold and the second threshold.

18. The computing device of claim 15, wherein, when the swipe gesture causes an end portion of the message icon to move past the first threshold and the second threshold, and then between the first threshold and the second threshold, the steps further include:
  causing a function status image to be displayed, and
  causing the first affordance and the second affordance to be displayed.

19. The computing device of claim 15, wherein the first message action involves: marking the at least one corresponding message as unread, moving the at least one corresponding message to a trash folder, marking the at least one corresponding message as important, moving the at least one corresponding message to a different folder, copying the at least one corresponding message to a different folder, and forwarding the at least one corresponding message to a recipient.

20. The computing device of claim 15, wherein, when the end point of the swipe gesture causes an end portion of the message icon to move toward the first threshold without passing the first threshold, the steps further include:
  determining whether the swipe gesture is being performed in a first direction or a second direction;
  when the user is performing the swipe gesture in the first direction:
    causing the user interface to display a first swipe status;
  when the user is performing the swipe gesture in the second direction:
    causing the user interface to display a second swipe status.

21. The computing device of claim 15, wherein, when the end point of the swipe gesture causes an end portion of the message icon to move toward the first threshold without passing the first threshold, the steps further include:
  determining whether the swipe gesture is being performed in a first direction or a second direction;
  designating the first threshold to be on a first side of the second threshold when the user is performing the swipe gesture in the first direction;
  otherwise, designating the first threshold to be on a second side of the second threshold when the user is performing the swipe gesture in the second direction.

* * * * *

UNITED STATES PATENT AND TRADEMARK OFFICE
CERTIFICATE OF CORRECTION

PATENT NO. : 9,898,162 B2
APPLICATION NO. : 14/292262
DATED : February 20, 2018
INVENTOR(S) : Mohammed N. Jisrawi et al.

It is certified that error appears in the above-identified patent and that said Letters Patent is hereby corrected as shown below:

In the Claims

In Claim 15, Line 49, after "message" delete "configurable".

Signed and Sealed this
Tenth Day of April, 2018

Andrei Iancu
*Director of the United States Patent and Trademark Office*